Figure 1:
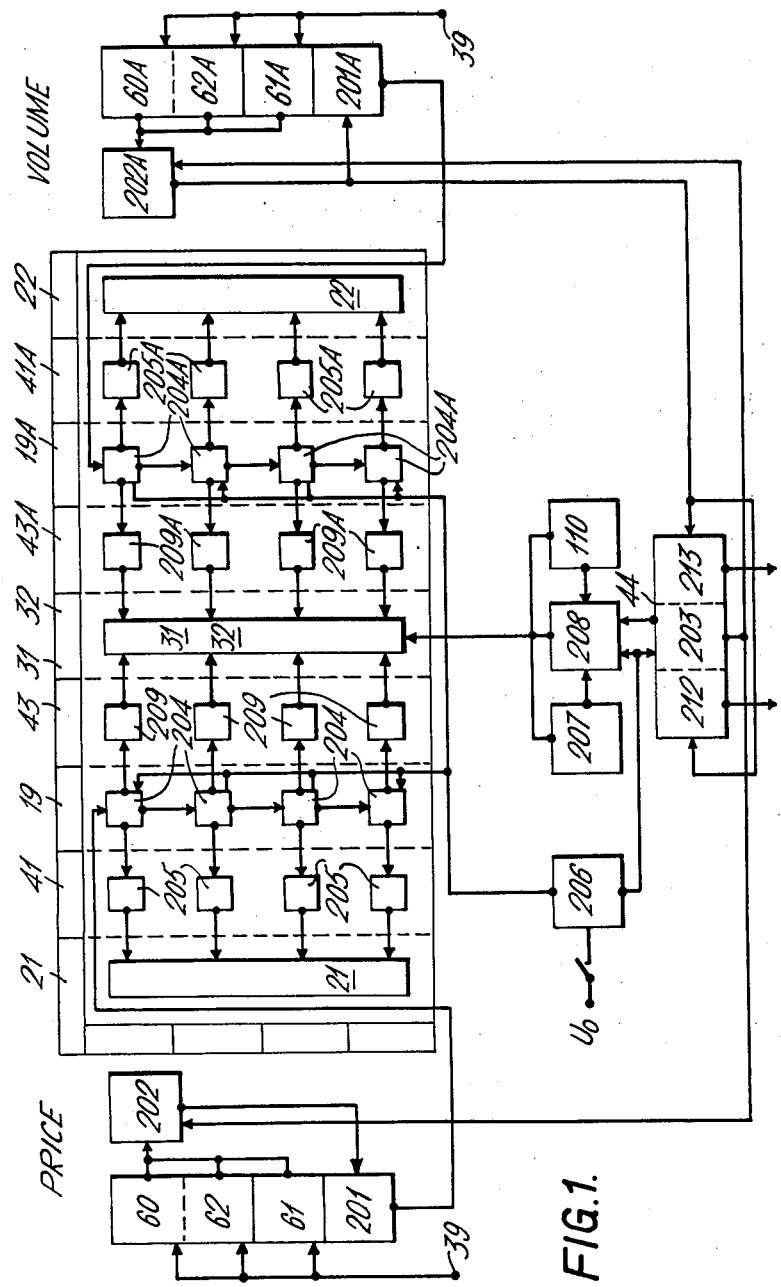

INVENTORS
RICHARD MORRISON PHILLIPS
DAVID JOHN LINDSAY-SCOTT
BY Morgan, Finnegan, Durham & Pine
ATTORNEYS

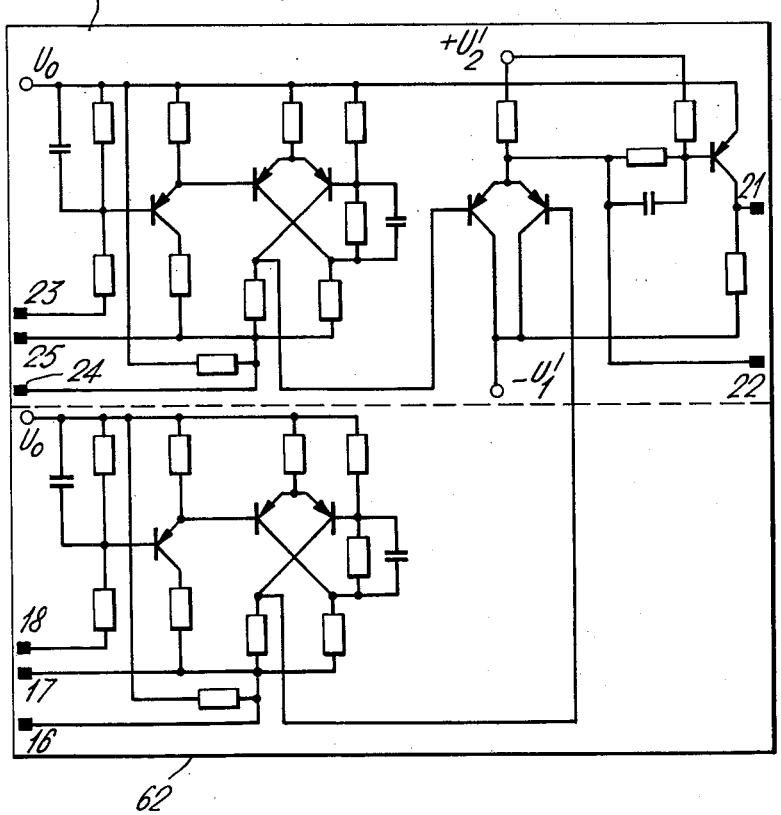
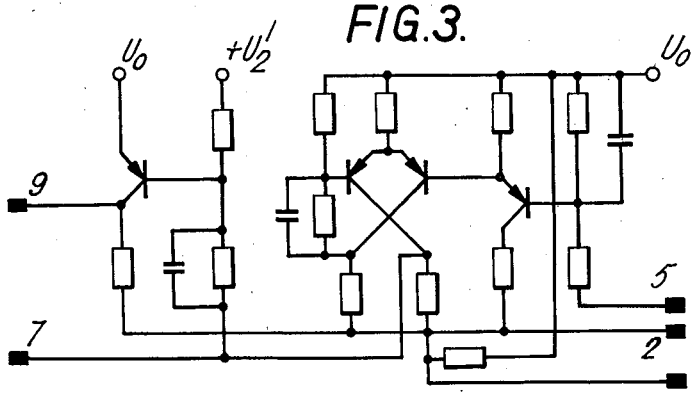

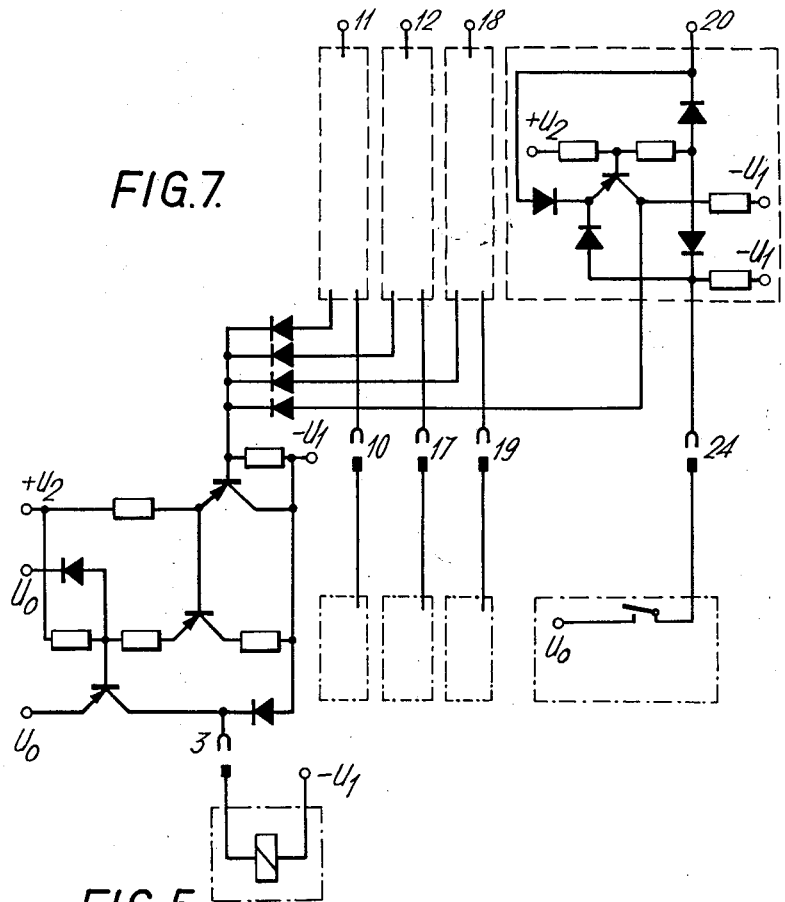
April 28, 1964 — R. M. PHILLIPS ETAL — 3,130,870
METERING SYSTEM
Filed March 30, 1961 — 21 Sheets-Sheet 5
INVENTORS
RICHARD MORRISON PHILLIPS
DAVID JOHN LINDSAY-SCOTT
BY Morgan, Finnegan, Durham & Pine
ATTORNEYS INVENTORS
RICHARD MORRISON PHILLIPS
DAVID JOHN LINDSAY-SCOTT
BY Morgan, Finnegan, Durham & Pine
ATTORNEYS

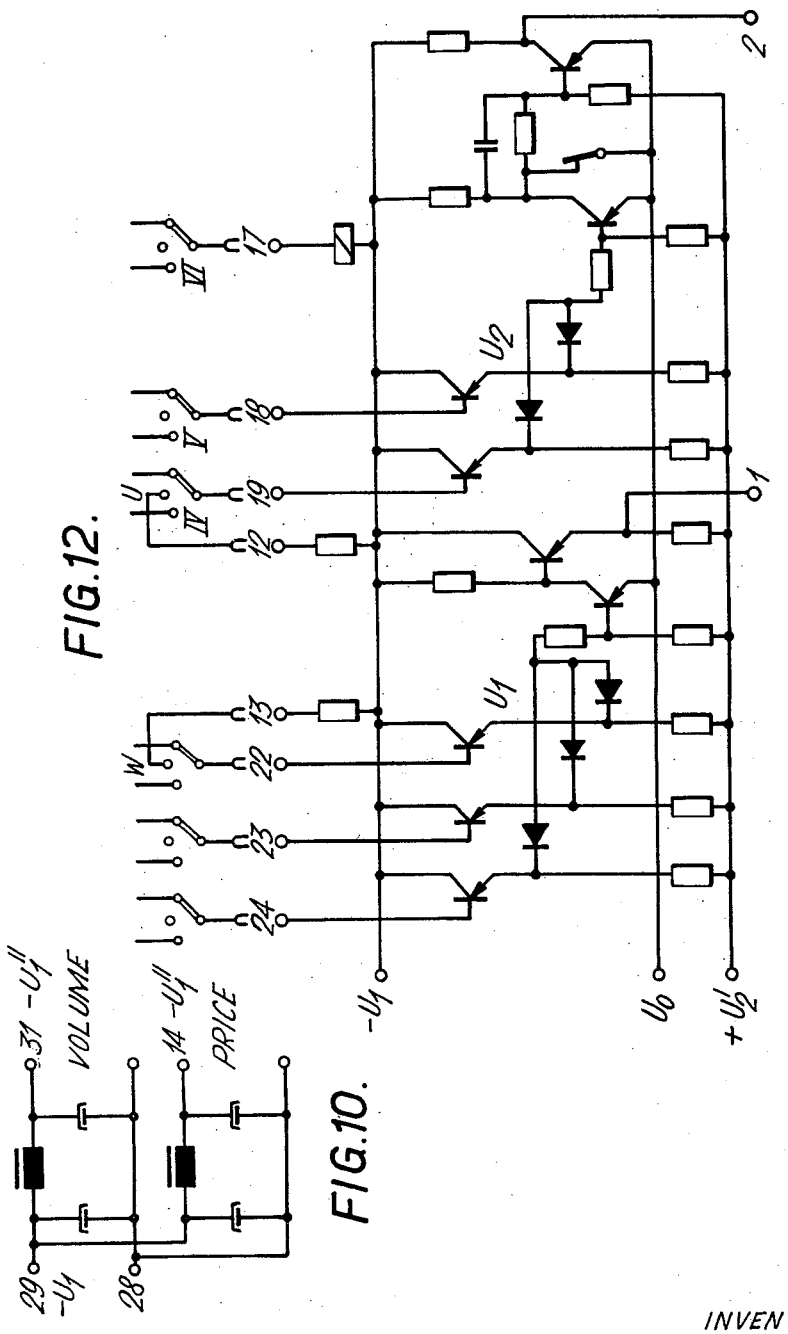

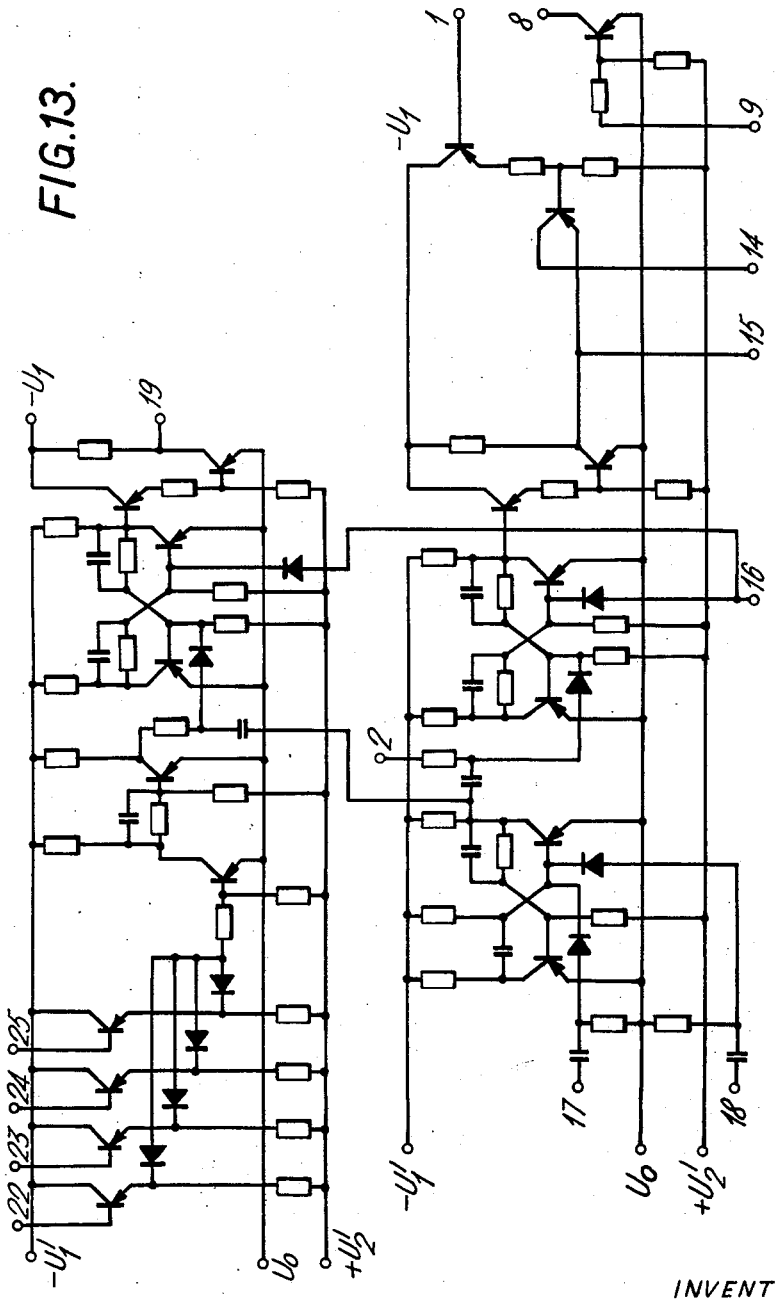

April 28, 1964  R. M. PHILLIPS ETAL  3,130,870
METERING SYSTEM
Filed March 30, 1961  21 Sheets-Sheet 11

INVENTORS
RICHARD MORRISON PHILLIPS
DAVID JOHN LINDSAY-SCOTT
BY Morgan, Finnegan, Durham & Pine
ATTORNEYS

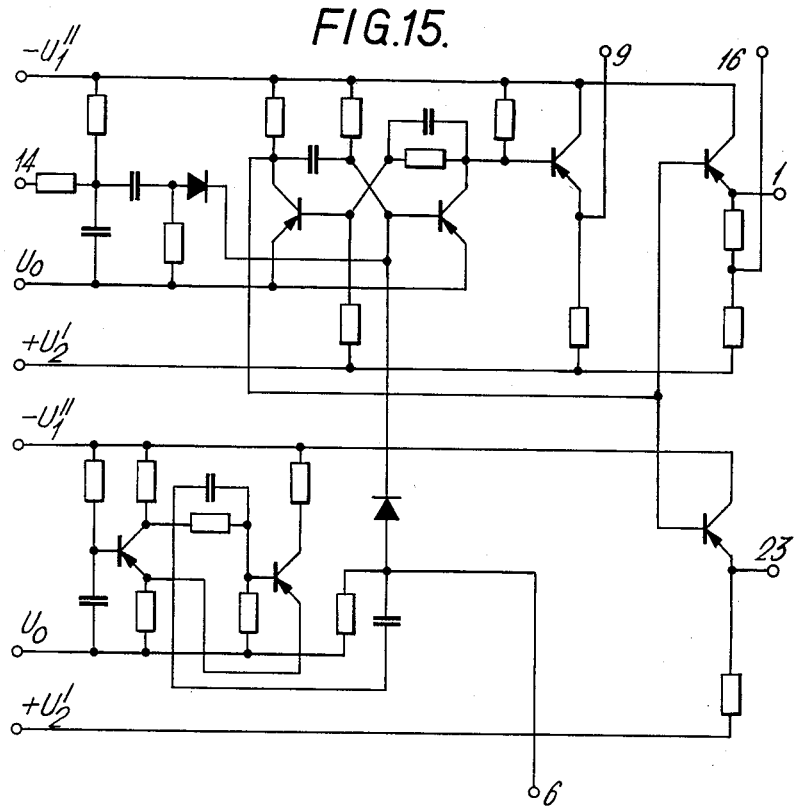
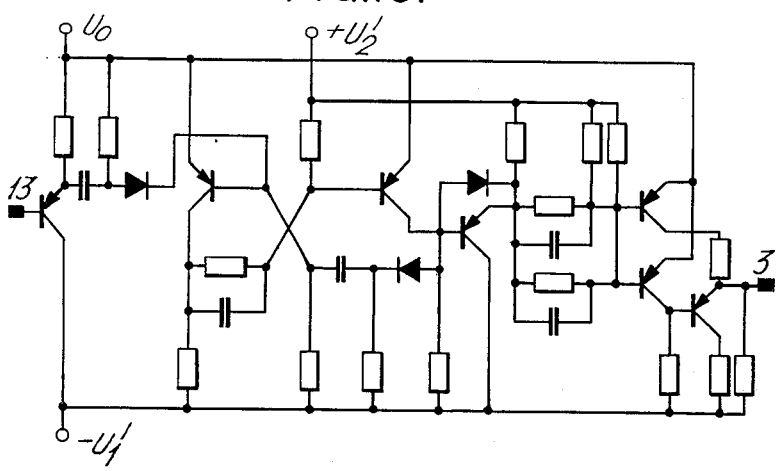

INVENTORS
RICHARD MORRISON PHILLIPS
DAVID JOHN LINDSAY-SCOTT
BY Morgan, Finnegan, Durham & Pine
ATTORNEYS April 28, 1964 R. M. PHILLIPS ETAL 3,130,870
METERING SYSTEM
Filed March 30, 1961 21 Sheets-Sheet 14
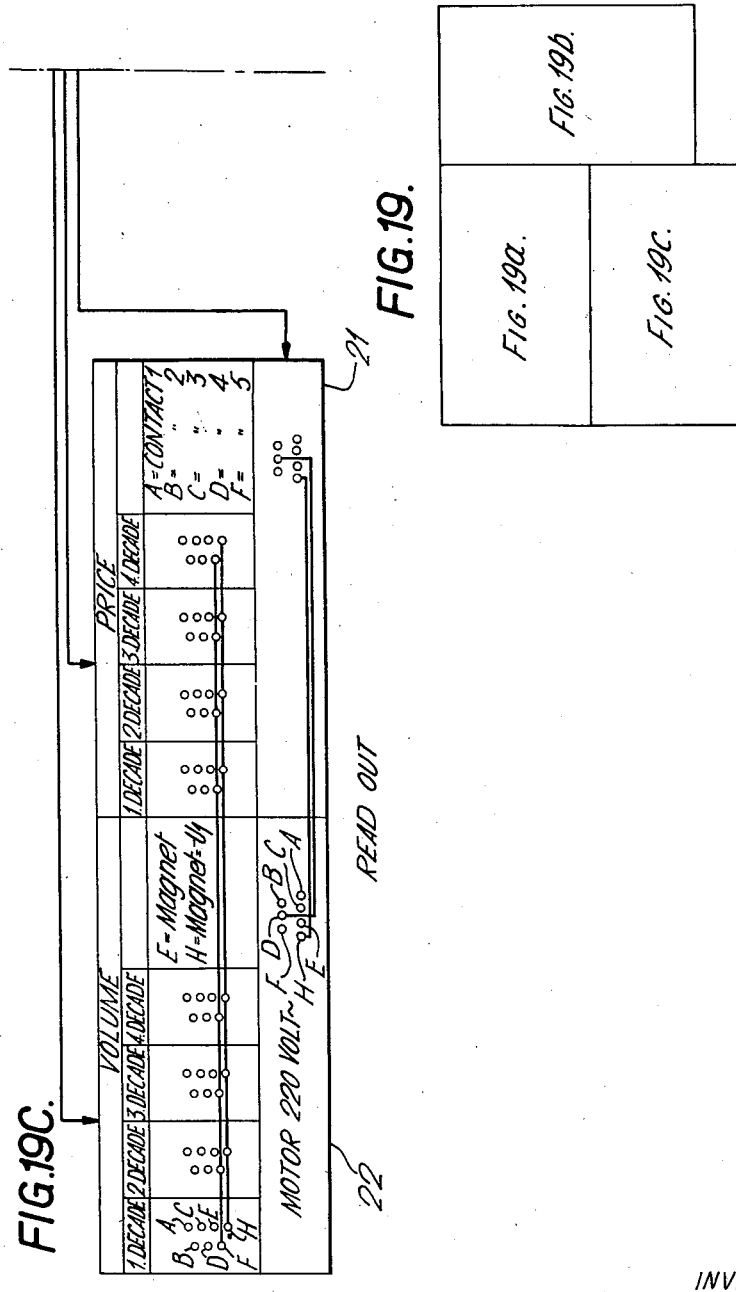
INVENTORS
RICHARD MORRISON PHILLIPS
DAVID JOHN LINDSAY-SCOTT
BY Morgan, Finnegan, Durham & Pine
ATTORNEYS April 28, 1964 R. M. PHILLIPS ET AL 3,130,870
METERING SYSTEM
Filed March 30, 1961 21 Sheets-Sheet 18

INVENTORS
RICHARD MORRISON PHILLIPS
DAVID JOHN LINDSAY-SCOTT
BY Morgan, Finnegan, Durham & Pine
ATTORNEYS April 28, 1964 R. M. PHILLIPS ETAL 3,130,870
METERING SYSTEM Filed March 30, 1961 21 Sheets-Sheet 21

INVENTORS
RICHARD MORRISON PHILLIPS
DAVID JOHN LINDSAY-SCOTT
BY Morgan, Finnegan, Durham & Pine
ATTORNEYS United States Patent Office 3,130,870
Patented Apr. 28, 1964

3,130,870
METERING SYSTEM
Richard Morrison Phillips and David John Lindsay-Scott, London, England, assignors to The British Petroleum Company Limited, London, England, and The de Havilland Engine Company Limited, Leavesden, Hertfordshire, England, both British joint-stock corporations
Filed Mar. 30, 1961, Ser. No. 99,418
Claims priority, application Great Britain Apr. 11, 1960
20 Claims. (Cl. 222—26)

This invention relates to an improved metering system. This invention also relates to an improved liquid product supply system comprising said metering system.

According to this invention there is provided a metering system comprising two meters, each adapted to measure a property of a different body of material and each connected to an electric signal transmitter giving a signal characteristic of the property measured, the system also comprising an electrical unit receiving the signals and giving an output signal which is a pre-determined function of the two input signals.

The output signal may be, for example, characteristic of (a) the sum of the values of the properties measured.
(b) the ratio of the values of the properties measured.
(c) the algebraic difference between the ratio of the values of the properties measured and a predetermined value.
(d) the point in time when the integral with respect to time of either of the values of the properties reaches a predetermined value.

According to a modification of this invention there is provided a metering system comprising a meter (a) being adapted for use in association with a fluid stream to measure a property of the stream or of the material of the stream and (b) when in use being in association with said fluid stream and (c) being connected to an electrical signal transmitter whereby there is provided a signal train of which the signal is recurring (with or without modulation) or continuous and either (i) the signal train overall is characteristic of the integral, with respect to time, of the property measured or (ii) the signal, at given time, is characteristic of the property measured by the meter; said system also comprising an electrical trigger circuit adapted to receive a signal train derived from the transmitter and adapted to provide an output electrical signal when the integral with respect to time of the property measured reaches a pre-set value. In general the trigger circuit will be provided with means for resetting.

According to another aspect of this invention there is provided a metering system comprising two meters, each meter (a) being adapted for use in association with a fluid stream to measure a property of the stream or of the material of the stream and (b) when in use being in association with a different fluid stream and (c) being connected to an electrical signal transmitter whereby there is provided a signal train of which the signal is either recurring or continuous and either (i) the signal train overall is characteristic of the integral with respect to time of the property measured, or (ii) the signal at given time is characteristic of the property measured; said system also comprising an electrical trigger circuit adapted to receive simultaneously a signal train derived from each of the transmitters and adapted to provide an output electrical signal when the integral with respect to time of the value of the property measured by either meter first reaches a pre-set value or when the sum of the sum of these integrals reaches a pre-set value.

If desired the metering system hereinbefore described may comprise more than two meters, each meter being connected to an electrical signal transmitter and wherein the output electrical signal is a function of the property as measured by selected meter or combination of meters or, if desired, as measured by all of the meters.

Preferably the signal train provided by each electrical signal transmitter is a pulse train.

Although this is not essential, in general each meter will be adapted to measure the same property. Properties so measured may be (a) inherent properties of the material constituting the stream for example specific gravity, viscosity, specific thermal or electrical conductivity or color (b) extrinsic properties of the material, for example temperature and available heat and (c) properties of the stream, for example pressure, flow rate, linear velocity and quantity.

The invention will hereinafter be described with reference to a system for the measurement of quantity; this however is merely illustrative and the invention is not limited to this type of system.

According to this aspect of the invention there is provided a metering system comprising two meters, each meter (a) being adapted for use in a fluid stream and being responsive to the quantity of fluid passing in association with the meter or to the flow rate of fluid passing in association with the meter, (b) being in use, connected to a different fluid stream and (c) being connected to an electrical signal transmitter whereby there is provided a signal train, the signals being recurring or continuous, the train being characteristic of the quantity of fluid which has passed the meter; said system also comprising an electrical summating unit adapted to receive, simultaneously, from each electrical signal transmitter the signal train, or a modified signal train derived from the initial signal train, and adapted to provide an output signal train which, either at given time or overall, is characteristic of the sum of the quantities of the fluids which have passed the two meters in a given period of time; said system also comprising an electrical trigger circuit adapted to receive said output signal train and adapted to provide an output electrical signal or signal train when the sum of the quantities of fluid passed in association with the two meters reaches a pre-set value.

Preferably there will be provided flow control means receiving the output signal and adapted to arrest the flow of the fluid streams when said sum of quantities reaches the pre-set value. Suitably the flow control means will comprise electrically operated valves situated in each of the fluid streams. Preferably the output signal from the trigger circuit consists of a first pulse followed after a fixed interval by a second pulse, the flow control means being adapted to diminish flow in each fluid stream on receipt of the first pulse and to arrest flow on receipt of the second pulse; in this manner "hydraulic hammer" effects may be avoided or reduced. Suitably the output signal consists of a single pulse, the flow control means being adapted to diminish flow in each fluid stream on receipt of the pulse and to arrest flow on termination of the pulse.

Preferably the trigger circuit of the metering system comprises a switch adapted to set up a first signal pre-set circuit adapted to be energized at a pre-determined number of pulses before the generation of the total number of pulses corresponding to the integral with respect to time of the value of the property of the fluid or fluids measured.

Preferably the metering system comprises a solenoid adapted to be energized by said first signal pre-set circuit and adapted partially to close said flow control means.

Preferably the metering system comprises a latch adapted to hold the flow control means in a partially closed position.

Preferably the trigger circuit of the metering system comprises a second signal pre-set circuit adapted to be energized by said first signal pre-set circuit, adapted to respond to the arrival of pulses received subsequently and adapted to initiate the operation of completely closing the flow control means at a point in time determined by the rate of generation of pulses to ensure that closure of the flow control means is completed at substantially the time of arrival of the last of the predetermined number of pulses.

Preferably the metering system comprises a solenoid adapted to be energized on receipt of a signal from said second signal pre-set circuit and adapted to release said latch, thereby permitting the flow control means to close completely.

Preferably each meter will measure the passage of unit quantity of fluid as a pre-determined angle of rotation of an output shaft. The meter may be of any type by which this effect is achieved. Preferably the meter is in the form of a power driven positive displacement pump whereby the fluid stream is both brought into motion or assisted in motion and is metered.

Preferably the transmitter is adapted for operation by a rotating shaft and is adapted to generate a pulse train wherein each pulse corresponds to a pre-determined angle of rotation of the shaft; in association with the preferred type of meter described hereinbefore, the passage of unit quantity of fluid will give rise to one pulse. Preferred transmitters are described in our co-pending British patent application Nos. 19859/59 or 36192/59 and 12789/60 (cognate).

Preferably the pulse train is subjected electronically to pulse shaping to derive a modified pulse signal of rectangular wave form.

When employing transmitters giving rise to pulse trains, the two pulse trains so derived may be employed to derive a single output signal train, preferably a pulse train by any form of pulse summation unit. This unit may be electro-mechanical; thus the pulse trains may be converted back to angular rotation of two shafts which are fed to a differential, the output shaft being used to drive a further transmitter. Preferably the pulse summation unit is electrical; a preferred unit is described in our copending British patent application No. 12786/60.

Preferably each summating unit of the metering system comprises a scanning unit adapted to scan each shaped pulse train at least twice during the duration of each pulse and adapted to give rise to a signal when a shaped pulse is detected on at least two occasions during the duration of the pulse.

Preferably the summating unit of the metering system also comprises an integrating unit adapted to receive signals from said scanning unit and adapted to give rise to two consecutive signals if two signals are received simultaneously from said scanning unit.

Preferably the summating unit of the metering system also comprises a digital electronic counter adapted to receive signals from said integrating unit.

Preferably the output signal of the summation unit is a pulse train and suitably this is fed to an electro-mechanical device in which each pulse gives rise to a pre-determined angle of rotation of an output shaft. This output shaft may be connected directly to a visual read-out for example a decade counter. Preferably, however, the output shaft is employed to generate further trains of electrical signals, each train being used in association with a different digit on the first counter of a bank of decade or similar counters in such manner that a pre-determined change in any one signal train causes a rotating digital read-out drum to be arrested in a position characteristic of the digit associated with this signal train. Alternatively the output signal of the summation is fed to an electronic digital decade counter which will channelize impulse signals suitably to operate a read-out system. Preferred read-out systems are described in our co-pending British patent application No. 21860/60 or in German Patent Application No. 630827 ix 42 p.

If desired the metering system may comprise three or more meters, each being as hereinbefore described and having associated therewith an electrical signal transmitter. If desired, a switch may be provided whereby any one or more (including all) transmitters are at given time connected to the electrical signal summating unit. It will be understood that in the case where a single transmitter is connected to the summating unit, the output signal will be characteristic of the output of the single meter served, without summating effect.

The metering system of this invention is particularly suitable for use in a liquid product dispensing system, for example, a petrol dispensing system for use in the sale of petrol to automobiles. The dispensing system will be adapted for the dispensing of blends of liquid products and by means of a metering system as hereinbefore described will provide an indication of total flow rate or total quantity of liquid product passing a meter, selected meters or all meters in given time, according to the particular type of indicator system employed.

According to another aspect of this invention there is provided a metering system comprising two meters, each meter (a) being adapted for use in a fluid stream and being responsive to the quantity of fluid passing in association with the meter or to the flow rate of fluid passing in association with the meter, (b) being, in use, connected to a different fluid stream and (c) being connected to an electrical signal transmitter whereby there is provided a signal train, the signals being recurring or continuous, the train being characteristic of the quantity of fluid which has passed the meter in given time, said transmitter, or if desired a second transmitter coupled to the first transmitter, providing a second signal train, the signal being recurring or continuous, the train being characteristic of the total price of the fluid passing in association with the meter in a given period; said system also comprising an electrical summating unit adapted to receive the signal trains or modified signal trains derived from the initial signal trains and adapted to provide two output signal trains, one of which, at given time or overall, is characteristic of the sum of the quantities of the liquid products which have passed the meters and the other of which, at given time or overall, is characteristic of the sum of the total price of each of the liquid products which have passed the meters; said system also comprising an electrical trigger circuit adapted either to receive both of said output signal trains or, by means of a switch, to receive, a selected output signal train and adapted to provide an output electrical signal or signal train when the sum of the quantities or total price of the liquid products passed in association with the meters reaches a pre-set value. Preferably two summating units and two trigger circuits will be employed, one combination of unit and circuit being used to summate and to trigger on pulse trains which are characteriistic of quantity and the other to summate and to trigger on pulse trains which are characteristic of total price. The output signal of the summating units may also be used to provide a read-out of quantity and/or total price; the dispensing system may comprise a read-out system as hereinbefore described.

According to another aspect of this invention there is provided a metering system comprising, also, a blending system as described in our co-pending British patent application No. 12787/60. Thus there is provided a metering system comprising two meters, each meter (a) being adapted for use in a fluid stream and being responsive to the quantity of fluid passing in association with the meter or to the flow rate of fluid passing in association with the meter, (b) being in use, connected to a different fluid stream and (c) being connected to an electrical signal transmitter whereby there is provided a signal train, the signals being recurring or continuous, the train being characteristic of the quantity of fluid which has passed the meter in given time, said transmitter, or if desired a second transmitter coupled to the first transmitter, providing a second signal train, the signal being recurring or continuous, the train being characteristic of the total price of the fluid passing in association with the meter in a given period; said system also comprising an electrical summating unit adapted to receive the signal trains, or modified signal trains derived from the initial signal trains, and adapted to provide two output signal trains, one of which, at given time or overall, is characteristic of the sum of the quantities of the liquid products which have passed the meters and the other of which, at given time or overall, is characteristic of the sum of the total price of each of the liquid products which have passed the meters; said system also comprising an electrical trigger circuit adapted either to receive both of said output signal trains or, by means of a switch, to receive a selected output signal train and adapted to provide an output electrical signal or signal train when the sum of the quantities or total price of the liquid products passed in association with the meters reaches a pre-set value; said system also comprising a circuit hereinafter referred to as the "balance circuit" adapted to receive, simultaneously, from each electrical signal transmitter the signal train or a modified signal train derived from the initial signal train and adapted to provide an output signal or signal train when the ratio of the values of flow rate, as measured by the meters differs from a predetermined ratio; said system also comprising an electromechanically operated flow control unit, adapted to be connected into one or other or both of the fluid streams and adapted to respond to signals derived from said electrical circuit to maintain the ratio of the flow rates at said predetermined ratio.

Preferably the balance circuit comprises a potentiometer fed by two continuous input signal trains, one at each end, one signal train and also the take-off from the movable contact of the potentiometer being fed to a differential electro-magnetic device by means of which, according to the relative strengths of current of the two trains fed to said device a signal or train of signals is caused in one or other of two output channels. Suitably one differential relay solenoid is connected to one input signal train, the other differential solenoid being fed by the potentiometer take-off.

The differential solenoids may operate a single relay arm which is employed to switch in one or other of two circuits carrying the output signals according to variations in the ratio of the strengths of the input signals and the ratio setting of the potentiometer contact.

Preferably the flow control unit is a pair of ganged valves, as described in our co-pending British patent application 12790/60.

The metering and blending system of this invention is particularly suitable for use in a liquid product dispensing system, for example, a petrol dispensing system for use in the sale of petrol for use in automobiles. The dispensing system will be adapted for the dispensing of blends of liquid products and by means of a metering and blending system as hereinbefore described, blends of petrol of the desired octane number, between the values of octane number of two fuels being blended, may be supplied. If desired, more than two fuels may be made available, separate meters and associated transmitters being employed for each fuel and a switch and valve system employed to permit the selection of any desired blend of two components.

Suitable electrical transmitters for use in the present invention are as follows. In each case the transmitter will be operated in response to the movement of a rotating shaft.

In one system, each transmitter drive shaft carries a cam or one or more arms which make and break an electrical circuit to give any predetermined number of pulses per revolution.

If desired, there may be used an electrical pulse generator element consisting of at least two endless tracks, each track being adapted to operate in conjunction with a follower and to give rise to a pulse signal when relative movement takes place between the track and an associated follower, at least two followers being provided whereby, in use, at least two pulse signals are derived simultaneously.

According to a modification of the transmitter last described, the pulse generator element will comprise an endless track, adapted to operate in conjunction with a follower and to give rise to a pulse signal, and a set of units consisting of at least two units, each unit bearing at least one endless track, as hereinbefore described, and being adapted for attachment to the element in such manner that, in use, the tracks of the element and unit attached thereto constitute a source of two trains of pulse signals having a fixed ratio of pulses per unit time, said ratio being of a value which is variable by the use of a different unit of said set.

With reference to the transmitters, having tracks as hereinbefore described, each or any of the tracks may consist of alternate sections of electrically conducting and non-conducting material; the track will be used in conjunction with a follower consisting of an electrical contact whereby a pulse train is constituted when relative movement takes place between the track and follower. Usually all conducting sections of a given track will be electrically connected; if desired, current may be passed to and/or from these sections by means of a second contact in continuous connection with a conducting track.

In accordance with another form of construction the track may be shaped to impart mechanical movement to a follower, for example a stylus, and this movement employed to generate a pulse train in any suitable manner, for example by using techniques well-known in the construction and performance of phonographic pick-up units. If desired a track consisting of alternate hills and valleys may be employed as a cam surface to effect the alternate opening and closing of a pair of contact points.

In accordance with another form of construction, each or any of the tracks may consist of alternate sections of differing ability for modifying a beam of light; this track, hereinafter referred to as a "light regulating track," will be used in conjunction with a follower consisting of a photoelectric device, for example, a photoelectric cell or a transistor, capable, under the action of a beam of light of variable strength of initiating, or of modifying the strength of an electric current. Preferably, the alternate sections will be opaque and non-opaque; preferably the non-opaque sections will be transparent. If desired, reflecting sections, for example, mirror sections may be alternated with non-reflecting sections. In use, the track will be illuminated, preferably by a directed beam of light, and the photoelectric device will be situated to receive light alternately of relatively high and low intensity as the different sections of the track in turn modify the light received from the initial source. Separate light sources may be employed for each track or a single light source may be employed for a number of tracks.

Suitably, according to the aspect of the invention last described, the track will be formed of an opaque material having perforations therein or having irregularities, for example, notches, along an edge, which constitute the non-opaque sections. Alternatively, the track may consist of a translucent or transparent material having relatively dark sections superimposed. Thus the track may be formed of photographic material, suitably processed.

Suitably, according to any of systems described hereinbefore, each track constitutes a ring upon the surface of a disc. If desired one track only may be provided on each disc and one or more discs mounted on a common axle. If desired one disc may be fixed to the axle and the other discs constitute a set from which a required disc may be selected and temporarily secured upon said axle. Alternatively, a plurality of tracks or all of the tracks may constitute a system of concentric rings upon a single disc. One or more followers may be adapted for movement, at the control of the operator, from one track to another; if desired each track may have its own follower and the required pulse trains selected by use of a mechanical or electrical switching system.

As a modification to the system described, the disc or discs may be replaced by (a) a cylindrical surface, or surfaces, upon which is or are carried the endless tracks or (b) an endless band or bands carrying the endless tracks.

While the apparatus may be designed for use with moving followers and stationary tracks, it will usually be found preferable to maintain the followers stationary and to employ rotating discs, cylinders or bands.

It will be apparent that a rotating shaft may be employed to drive a pulse generator, comprising a generator element in accordance with the invention, whereby there is obtained two pulse trains. In each pulse train, the number of pulses per unit time will be variable, being a fixed number of pulses per shaft revolution and thus dependent upon rate of revolution of the shaft. However, irrespective of the rate of revolution of the shaft, the ratio of the number of pulses per unit time in the two pulse trains will be constant; similarly the ratio of total number of pulses in the two pulse trains for a given number of revolutions of the shaft will be constant. However, by exchanging one of the tracks for a further track having different pulse generating characteristics, said ratio of the number of pulses per unit time (and said ratio of total number of pulses) will be changed to a new value.

According to another aspect of this invention there is provided a liquid product supply system comprising a metering system, as hereinbefore described, a read-out system and a set of strong tanks, each tank being provided to contain a different liquid product and having associated therewith a pump, a meter having a mechanical output responsive to the quantity of product passed therethrough and a transmitter mechanically driven by the meter and adapted to transmit monitoring electrical signals, in response to the mechanical output of the meter, to the actuating mechanism of the read-out system.

It will be understood that in the simplest case a "set" of storage tanks consists of two tanks. Thus, for example, as applied to the sale of motor fuel, a selection may be given between regular and premium grades.

In a liquid product supply system, according to this invention, for dispensing fuel to vehicles it is preferred that storage tanks, pumps and meters may be located below ground level, as hereinafter defined and the read-out system be located above ground level, as hereinafter defined.

By "ground level" we mean the level of the area within which vehicles would stand while being supplied from the system of this invention.

Suitably, in a system according to this invention for use in dispensing fuel to vehicles, the read-out system is portable. Thus a small portable read-out unit, connected to the remainder of the system by a flexible electrical lead, may be set up by the operator within view from the driving position of a vehicle to which fuel is to be supplied.

Suitably two read-out systems will be employed simultaneously for a given sale, these systems being adapted to operate electrically in parallel, one system being a fixed unit, located to provide indication to the operator of the quantity of fuel dispensed to a vehicle and a second system being a portable unit and adapted for location to provide indication at the driving position of said vehicle of said quantity.

It will be understood that in accordance with this invention a plurality of dispensing positions, each equipped with an indicator system and set of supply hoses, may be operated using a single storage tank and pump for each different liquid material dispensed. A separate meter may be provided in association with each supply hose; alternatively, a single meter may be provided for each liquid material dispensed and an electrical selection system provided to enable only one dispensing position to be supplied through a given meter at given time. It will be apparent that, if desired, a compromise may be effected between these alternatives wherein, for operating convenience, certain dispensing positions share the use of a given meter.

It will be understood that the liquid product supply system according to this invention may compromise also conventional ancillary equipment, for example filters, air-separators, totalizers, supply hoses and supply nozzles.

It is believed that by the use of a liquid product supply system according to this invention it may prove possible to obtain substantial advantages in roadside fuelling service, for example by:

(1) Reducing the number of curbside pumps which are necessary to supply products to provide standby equipment.

(2) Providing more room on the sales "island."

(3) Reducing the area required as standing space for vehicles since all products may be made available at one fueling position. Thus at present time, by way of contrast, the sale of five products at five curbside pumps necessitates an "island" length of 15 feet.

Furthermore:

(4) The indicator head may be self containing except for quick acting electrical connections and one actuating lever to operate the trigger nozzle locking device; in the event of this piece of equipment breaking down its replacement by a spare (which could be held at each station) would require only a few minutes of an operator's time and would not require skilled fitting.

Figure 18:
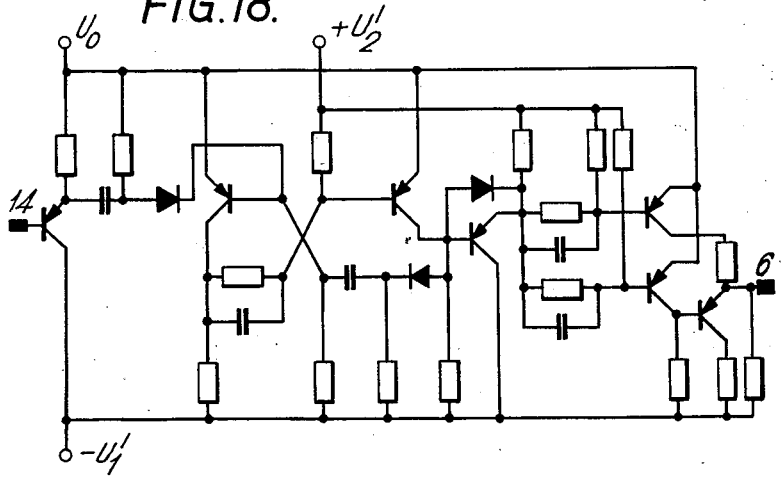
Figure 19A:
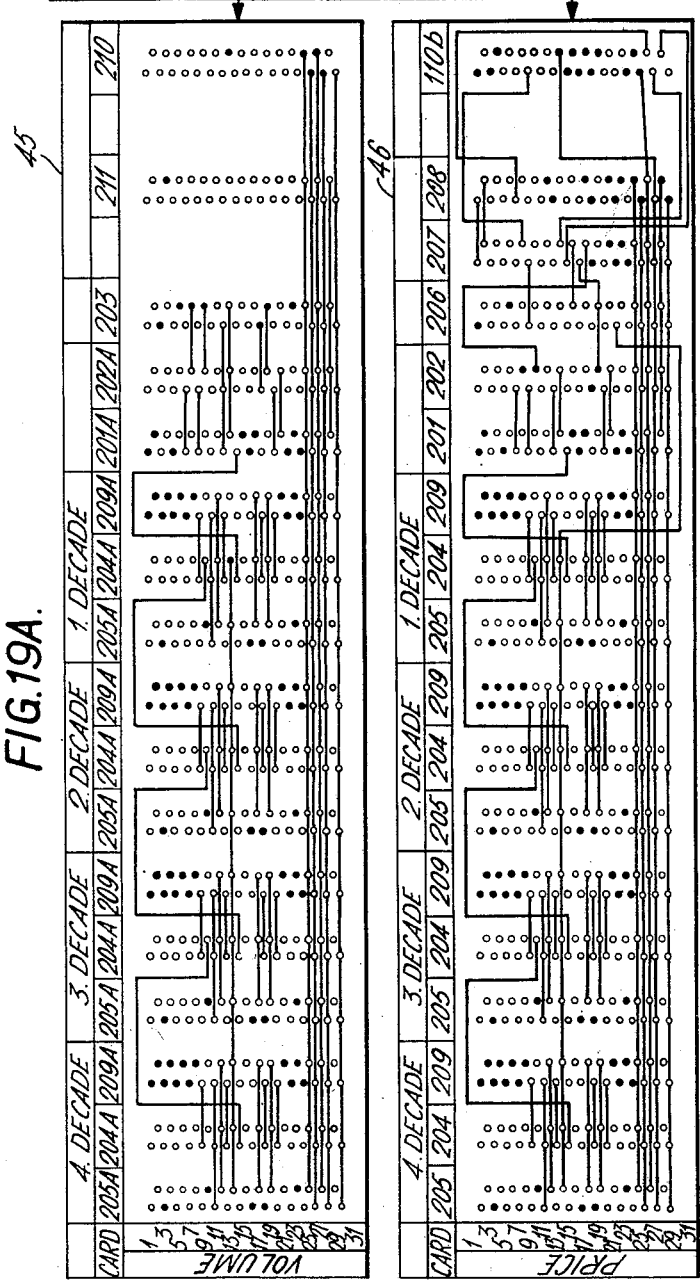
Figure 19B:
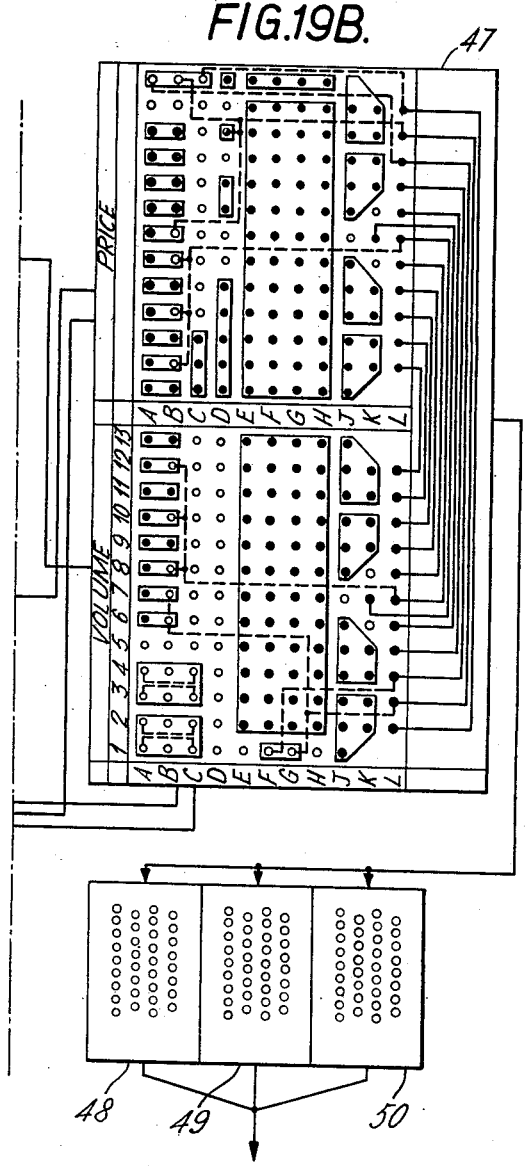
Figure 20:
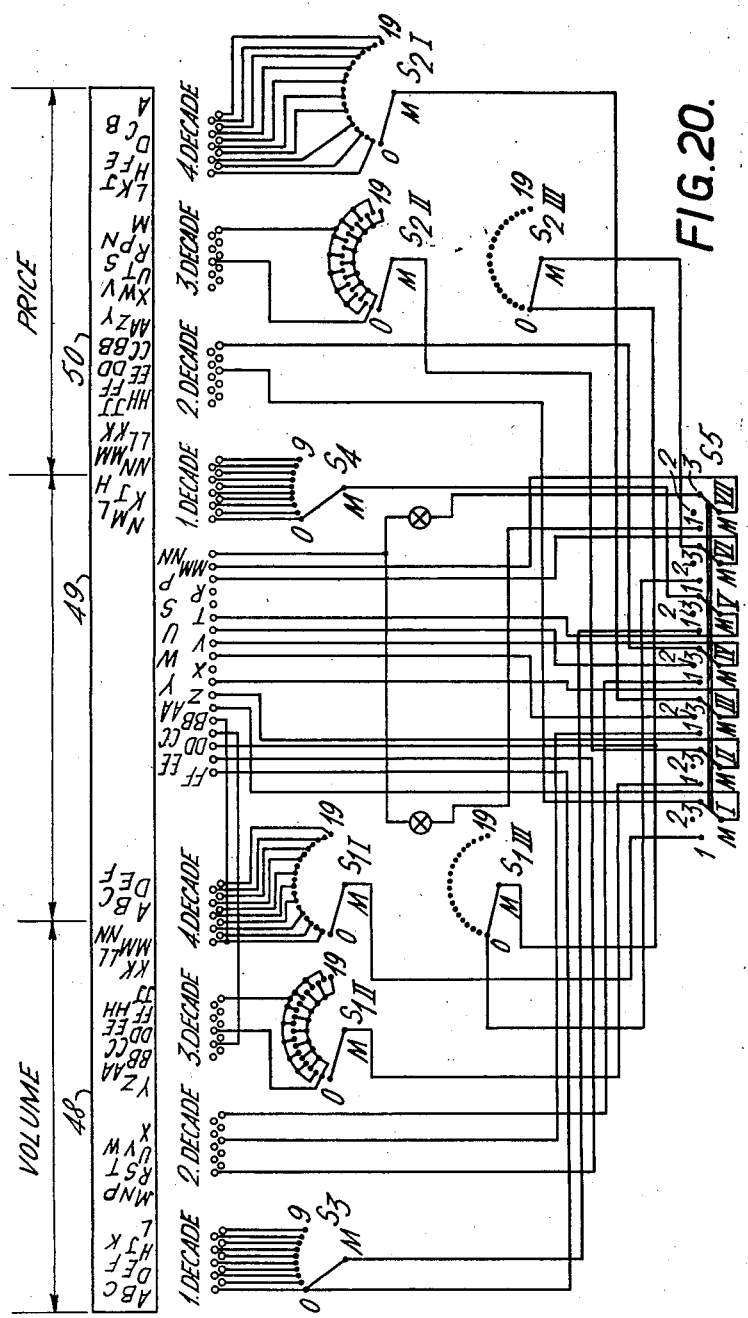
Figure 21:
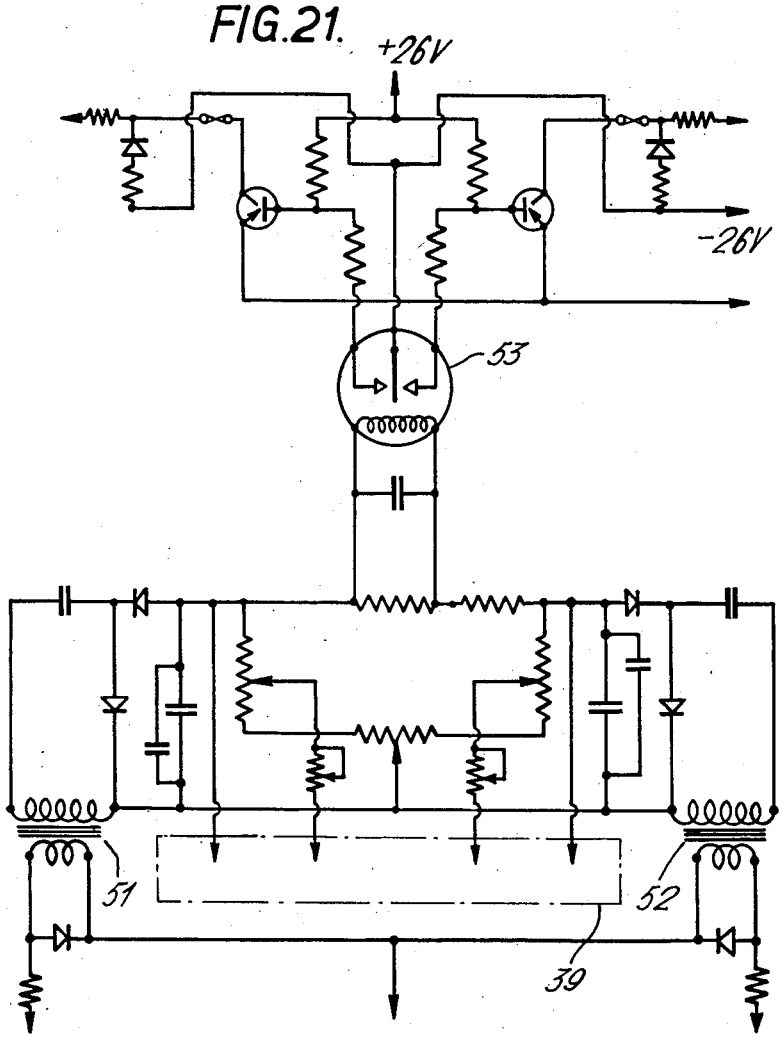
Figure 22:
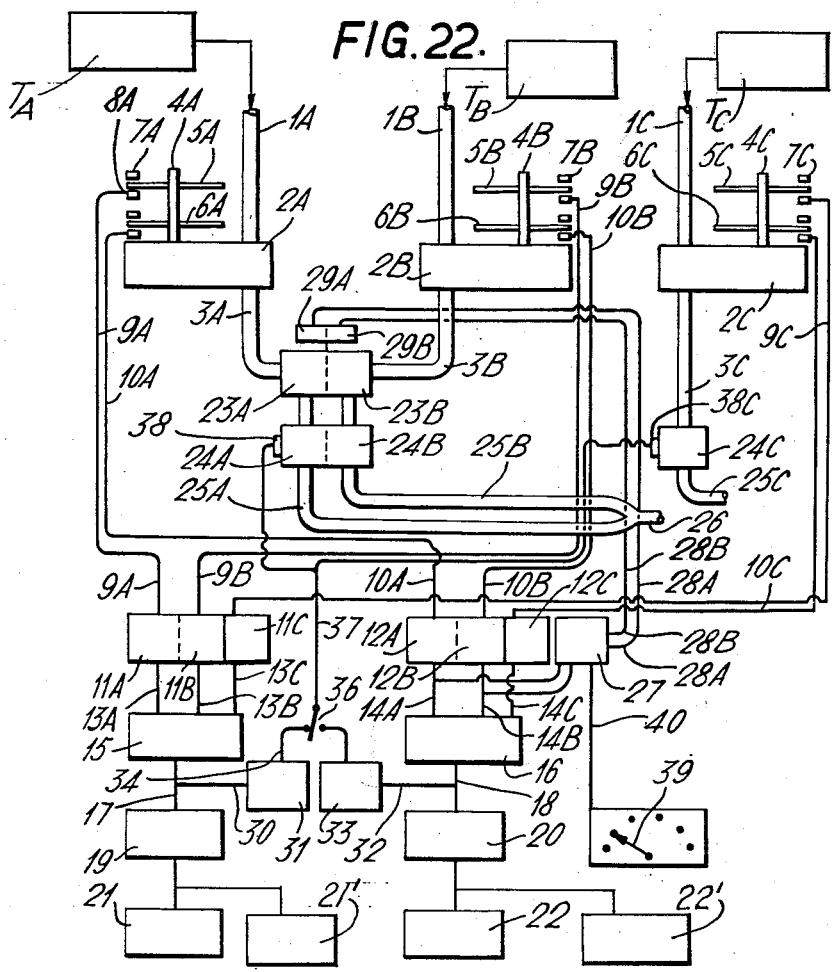

The invention is illustrated by, but not limited with reference to the FIGURES 1–3, 4A, 4B, 5–19, 19A, 19B, 19C and 20–22 of the accompanying drawings, wherein FIGURE 1 is a block diagram of the electrical and electronic circuitry in the pulse generation, pulse summation, pre-set and read-out stages of the system described with reference to FIGURE 22, FIGURES 2, 3, 4A, 4B, 5–18 or circuit diagrams of the sections of the circuitry represented in block form by FIGURE 1, FIGURES 19A, 19B, 19C and 20 are representations of terminal boards whereby connections may be made from one section of the circuitry to another, FIGURE 19 is a block diagram showing the manner in which connections are made between the boards disclosed with reference to FIGURES 19A, 19B and 19C, FIGURE 21 is a circuit diagram of the blend control stage of the system, and FIGURE 22 is a schematic flow diagram of a system comprising fluid metering, pulse generation, pulse summation, blend control, pre-set and read-out stages, adapted to dispense either of two selected products, or a number of blends of fixed proportions of the two products, or a third selected product.

The invention is further illustrated by Tables 1–24 which supply information by means of which, when taken in conjunction with the reference numerals on FIGURES 1–20, a lead may be traced from one section of the circuitry to another, and hence by means of which a complete circuit diagram may be constructed, the functions of the components of which will be apparent to those skilled in the art.

Figure 23:
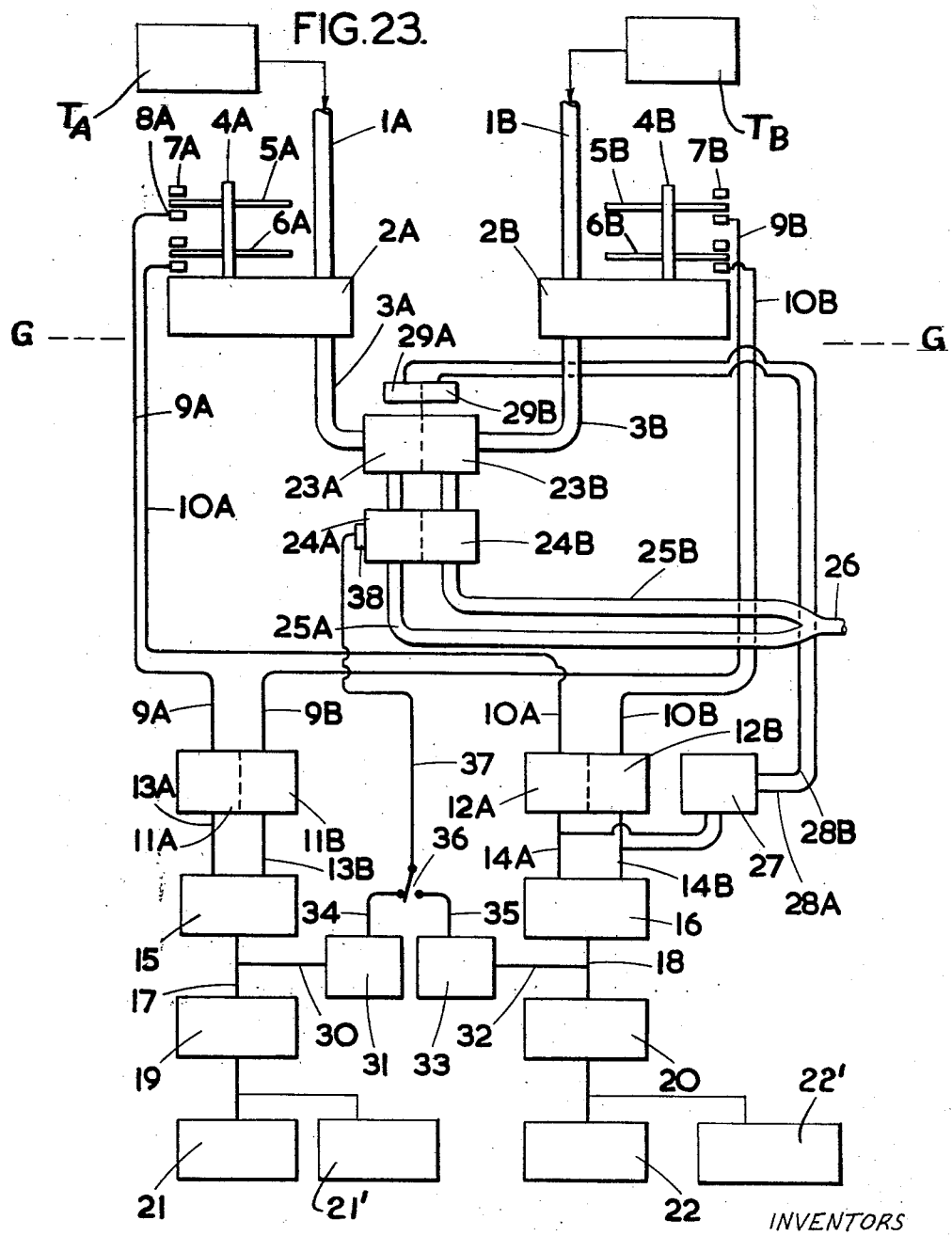
Figure 24:
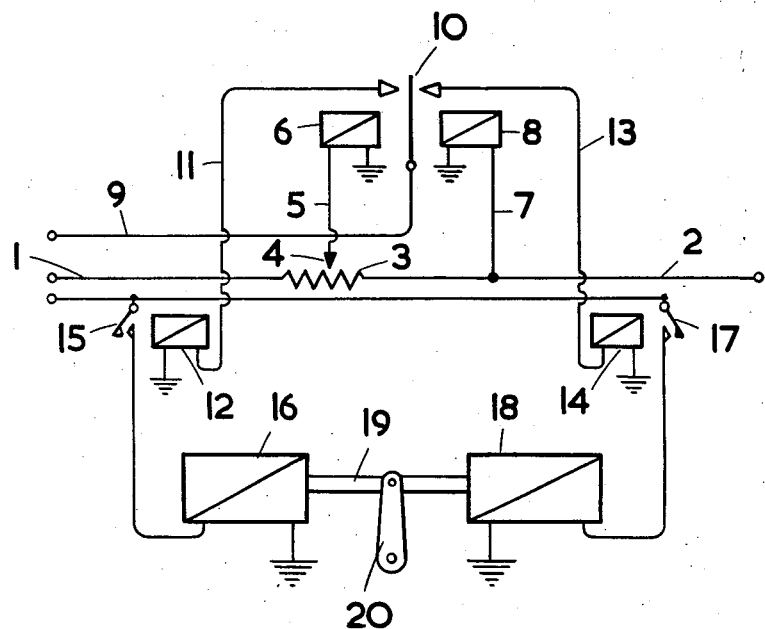

The invention is further illustrated by but not limited with reference to FIGURES 23 and 24 of the accompanying drawings, corresponding to FIGURES 1 and 2 respectively of the drawings accompanying the provisional specification wherein FIGURE 23 is a schematic flow diagram of a system comprising fluid metering, pulse generation, pulse summation, blend control, pre-set and read-out stages and FIGURE 24 is a circuit diagram of a form of balance circuit, suitable for use as circuit 27 with reference to FIGURE 23.

With reference to FIGURE 23:

A liquid product supply line 1A communicating with a storage tank $T_A$ is connected to flow meter 2A, which preferably includes a pump, take-off being by line 3A. The tank, pump and meter preferably comprise a section of the system disposed below ground level is indicated by the broken line G—G. Metering output is by rotating shaft 4A, connected to discs 5A and 6A which each have alternate sectors of transparent and opaque material forming a ring near the periphery. A light source 7A is set to cast a beam through the transparent sectors of disc 5A, the beam being received by photoelectric cell 8A which, as a result of the interruption of the light beam during rotation of disc 5A, gives rise to a pulse train in lead 9A. Similarly disc 6A gives rise to a pulse train in lead 10A.

Similarly, a second liquid product supply line 1B communicating with a storage tank $T_B$ is connected to meter 2B which preferably includes a pump and which is used in a duplicate system to provide pulse trains in leads 9B and 10B.

Pulse trains carried by leads 9A, 9B, 10A and 10B are modified by pulse shaping circuits 11A, 11B, 12A and 12B respectively to rectangular wave form, output being by leads 13A, 13B, 14A and 14B respectively.

Pulse trains carried by leads 13A and 13B are added in pulse summating unit 15; similarly pulse trains carried by leads 14A and 14B are added in unit 16.

The output pulse trains of units 15 and 16 are carried by leads 17 and 18 and are related to the flow of liquid product through meters 2A and 2B as follows:

Disc 6A and 6B are provided with a number of alternate sectors of transparent and opaque material such that the output signal carried by lead 18 has a convenient pulse frequency for subsequent use in a pulse counter. Disc 5A has a number of sectors which provides a pulse train in lead 13A which is a measure of the total price of the liquid passing through meter 2A; disc 5B has, in general, a different number of sectors proportional to the different price of the liquid passing through meter 2B and thus gives rise to a pulse train in lead 13B which is a measure of the total price of the liquid passing through meter 2B. The summated pulse train in lead 17 is a measure of the total price of the two liquids which have passed through the meters.

The pulse trains in leads 17 and 18 are passed to pulse counters 19 and 20 respectively which are connected, usually electrically or mechanically, to read-out indicators 21 and 22 respectively, and advantageously, to similar portable indicators 21' and 22', respectively. The latter in some applications may include their own respective pulse counters.

Control of blending is effected as follows:

Liquid products passing by lines 3A and 3B are fed to ganged valves 23A and 23B, thence by ganged throttling valves 24A and 24B to lines 25A and 25B and are blended in line 26.

From leads 14A and 14B signal pulse trains are fed to balance circuit 27 in which the signal pulses are converted to continuous variable strength signals and an output signal generated in one or other of lines 28 or 29 according to which input signal is over strength in relation to the other; pre-setting of the balance circuit permits a desired ratio to constitute the criterion. Leads 28A and 28B are connected to electromagnetic valve operating units 29A and 29B connected to ganged valves 23A and 23B respectively. Signals carried by leads 28A and 28B maintain the blend in line 26 at the previously selected blending ratio.

Pre-setting for the delivery of a pre-determined value or volume of total liquid product is effected as follows:

The pulse train carried by lead 17 is also fed by line 30 to pre-set unit 31; similarly the pulse train carried by lead 18 is fed by line 32 to pre-set unit 33.

Output from units 31 and 33 is taken by lines 34 and 35 to switch 36 which enables pre-setting to be based either on value or volume, according to the unit in circuit. Units 31 and 33 comprise trigger circuits and are activated to give an output signal or receipt of a pre-set number of pulses.

The output signal is carried from switch 36 by lead 37 to valve actuating unit 38 which on receipt of the signal shuts down ganged valves 24A and 24B.

Operation is as follows:

Balance unit 27 is set to the required blending ratio and, if pre-set of total supply is required, either unit 31 is set for total price or unit 33 is set for total volume, switch 36 being set accordingly. Valves 24A and 24B are opened and liquid product thereby allowed to pass through the meters to blend at 26, a continuous read-out of total price and volume being given by indicators 21 and 22. Blending ratio is continuously maintained in adjustment by unit 27 acting on valves 23A and 23B. When the required quantity of liquid product has been passed through the meters, valves 24A and 24B will close.

Between operations, read-out digits will be re-set to zero.

The system is particularly suitable for the sale of liquid fuels for use by motor vehicles at roadside supply or service stations.

With reference to FIGURE 24:

Control signals are fed into leads 1 and 2, connected across potentiometer 3. A movable contact 4 is connected by lead 5 to solenoid 6; lead 7 is connected to solenoid 8. Current is fed by lead 9 to differential relay arm 10 which completes circuit either through lead 11 and solenoid 12 or through lead 13 and solenoid 14. Relay arm 15 completes a power circuit to actuating solenoid 16; similarly arm 17 completes a power circuit to actuating solenoid 18. Solenoids 16 and 18 control arm 19 and lever 20.

With reference to FIGURE 22:

The system is as described with reference to FIGURE 23 with the addition of a third set of units, designated by the suffix C identical to those described with reference to FIGURE 24 with the exception that a blend control valve is not provided.

A selector switch 39 connected by means of a lead 40 to the blend control circuit 27 is provided whereby the system may be selected to dispense either the first liquid product or the second liquid product or any one of a number of preselected blends of the first and second liquid products or the third liquid product.

With reference to FIGURES 1–3, 4A, 4B, 5–18 and 22:

Pulses from price transmitter 5A and/or price transmitter 5B or price transmitter 5C, according to the setting of selector switch 39, are fed into pulse shaping circuit 60 and/or 61 or 62, respectively, from which they emerge in rectangular wave form. Pulse shaping circuits 60 and 62 are disclosed in diagrammatic form by FIGURE 2, pulse shaping circuit 61 by FIGURE 3.

When a selected blend of two selected fluid products is dispensed, pulses are transmitted concurrently from transmitters 5A and 5B.

Figure 4A:
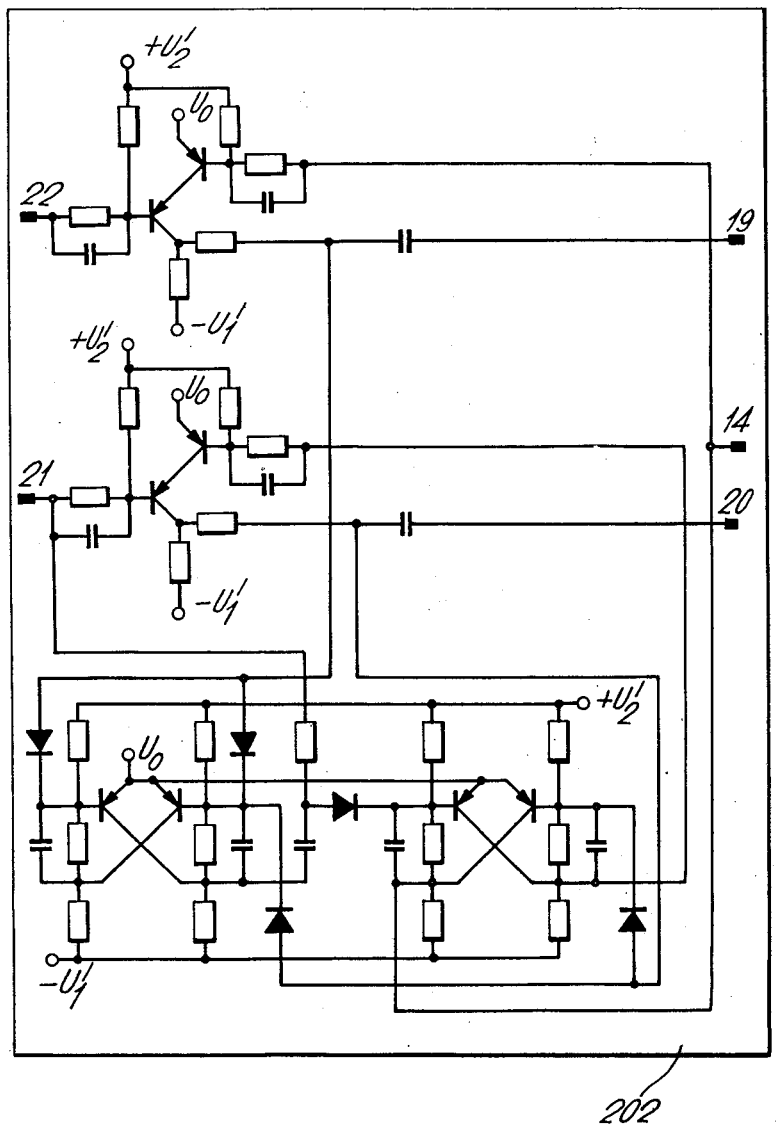
Figure 4B:
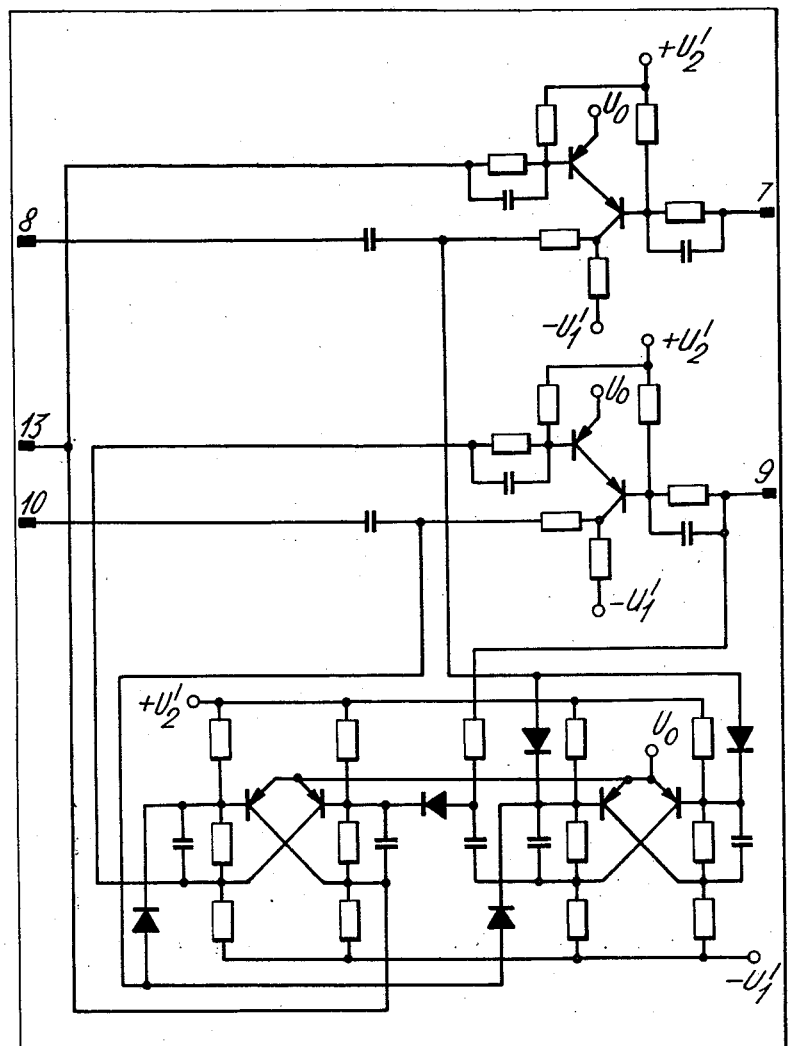

Shaped pulses from circuits 60 and/or 61 or 62 are then channelled to electronic scanning unit 202 disclosed by FIGURE 4A in which an electronic switch scans each pulse channel at a rate which is approximately six times as fast as the maximum pulse input frequency. A signal is generated by scanning unit 202 if and only if a channel is scanned at least twice and a shaped pulse is detected on each occasion. Spurious pulses are therefore not recognized by the scanning unit and do not give rise to signals therefrom.

Signals from the scanning unit 202 are then fed into integrating unit 201, disclosed by FIGURE 5, which integrates and transmits signals received from the scanning unit to pulse counter 19. If two signals are fed simultaneously to integrating unit 15, an extra pulse is triggered off therein and two signals are fed to counter 19.

Figure 6:
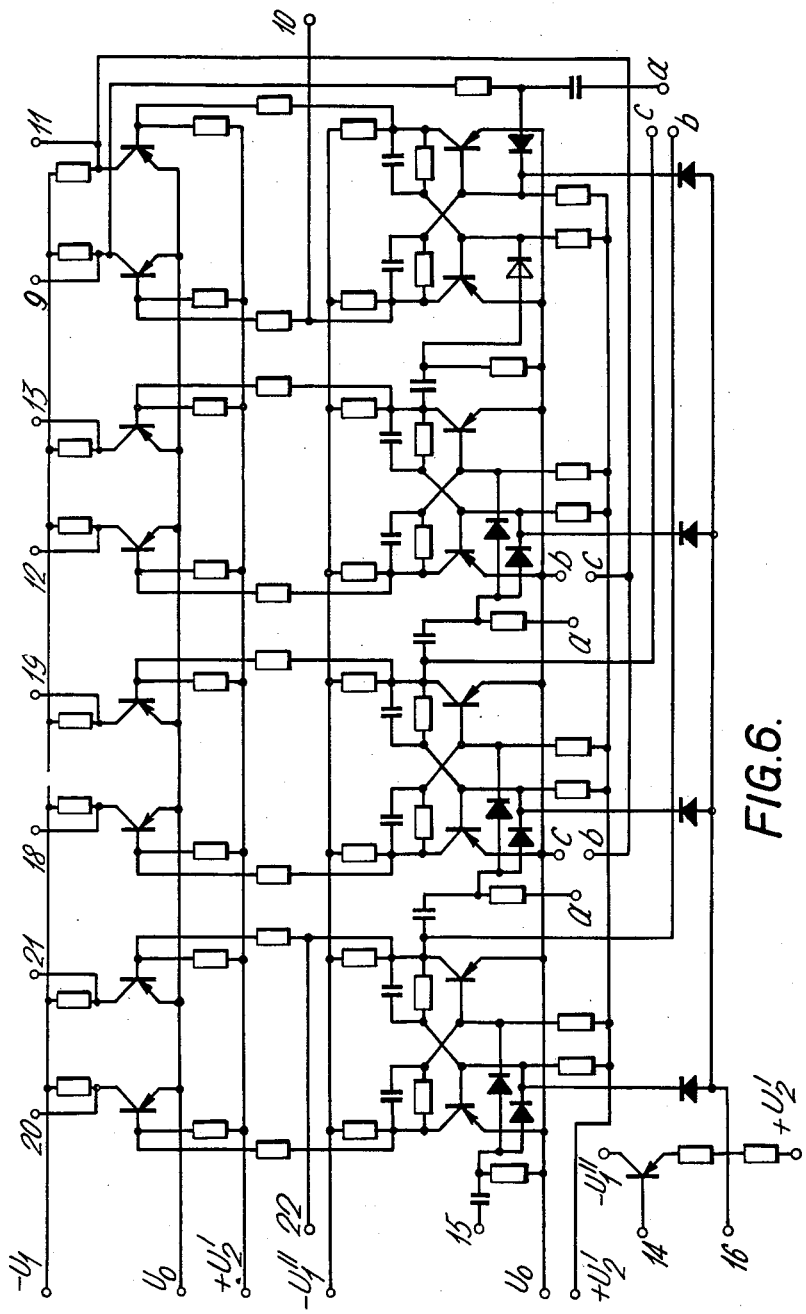

Counter 19 is of the four decade digital type and comprises four circuits 204, each disclosed by FIGURE 6. Output signals from each circuit of counter 19 are then amplified by means of a drum controller, comprising four circuits 205, each disclosed by FIGURE 7, and then supplied to read-out system 21 disclosed by German patent application No. 630827 ix 42 p.

Figure 8:
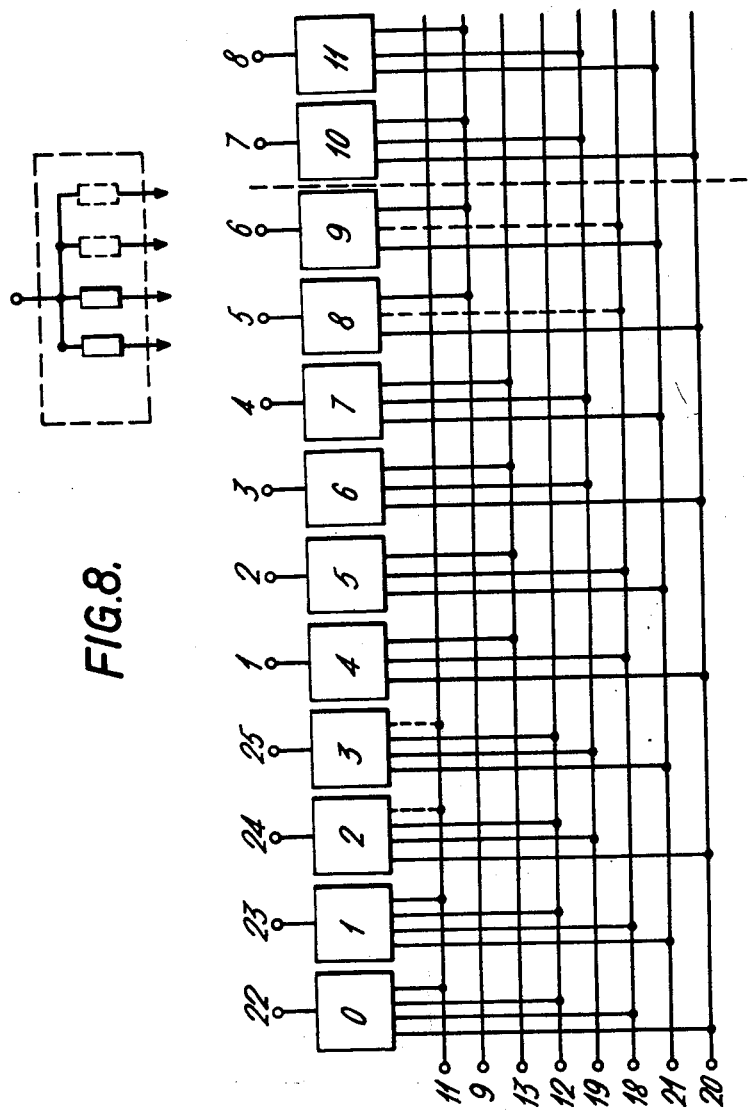
Figure 9:
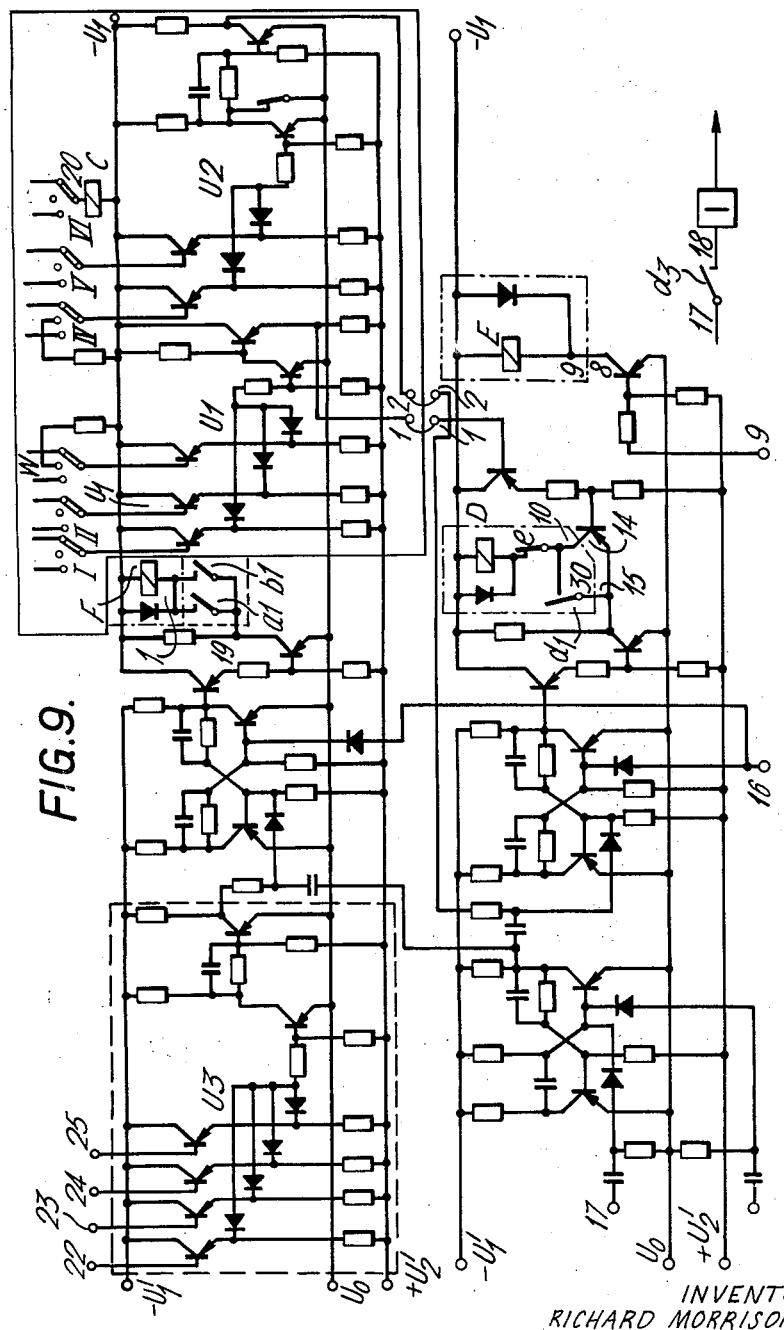

Output signals from each circuit of the counter are also fed by means of distributor 43, each distributor comprising four tracks, each track disclosed by FIGURE 8, into pre-set selector switch unit 31—32, disclosed by FIGURE 12.

The circuits and units described to this point constitute apparatus for measuring and presetting the value of the product which may be dispensed by the system. The system also comprises a second set of circuits and units, for measuring and presetting the volume of the product which may be dispensed from the system, identical to the units so far described; these are identified in FIGURE 1 by the addition of the suffix "A" to the reference numerals. At a pre-determined number of pulses before delivery of the pre-set value or volume of fuel, corresponding to a pre-determined total number of pulses, a first signal pre-set unit 207 disclosed by FIGURE 12 is energized. Unit 207 in turn energizes a pre-set trip solenoid or solenoids controlling shut off valves 24A and/or 24B or 24C which thereupon partially close, being prevented from closing completely by a latch. Unit 207 also triggers second signal preset signal unit 208, disclosed by FIGURE 13, which then responds to pulses received subsequently until the time required to receive the number of pulses required to complete the predetermined total number of pulses equals the time required to close the valve or valves completely, whereupon the latch is released and the valve is allowed to close completely.

Figure 11:
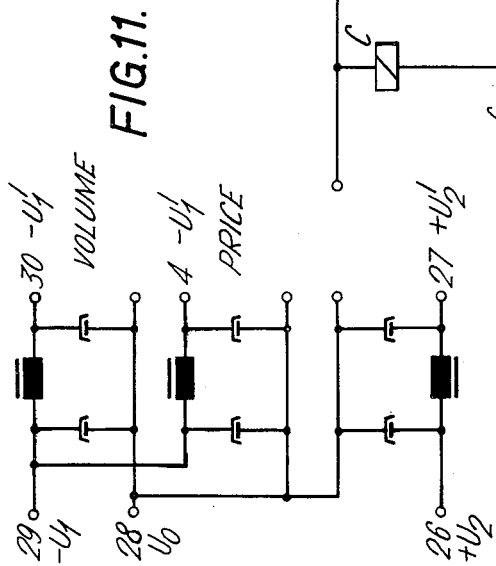

Screening circuits 210 and 211, disclosed by FIGURES 10 and 11, are provided.

Figure 14:
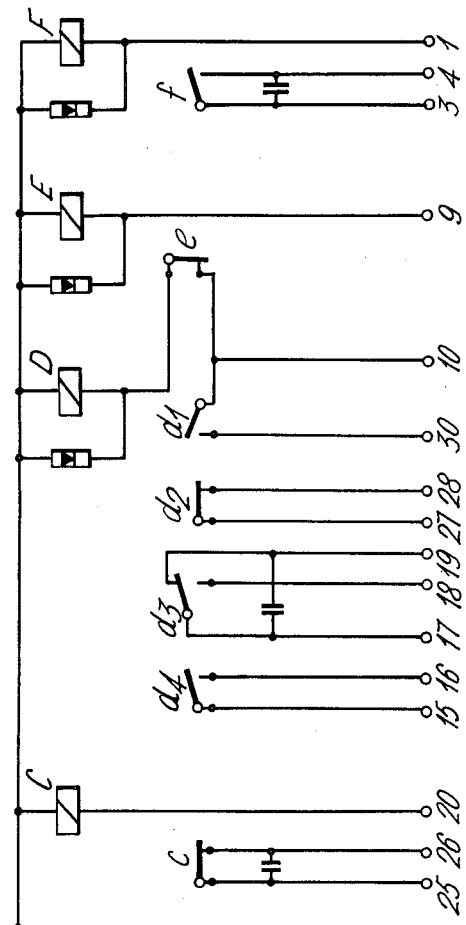

A system of hold in relays 110 is disclosed by FIGURE 14.

Start up unit 206, disclosed by FIGURE 15, is provided which, when an appropriate nozzle is removed from its holder, runs the drums of read-out systems 21 and 22 to zero, energizes valve actuating mechanism 38 or 38C and switches itself off again.

Figure 17:
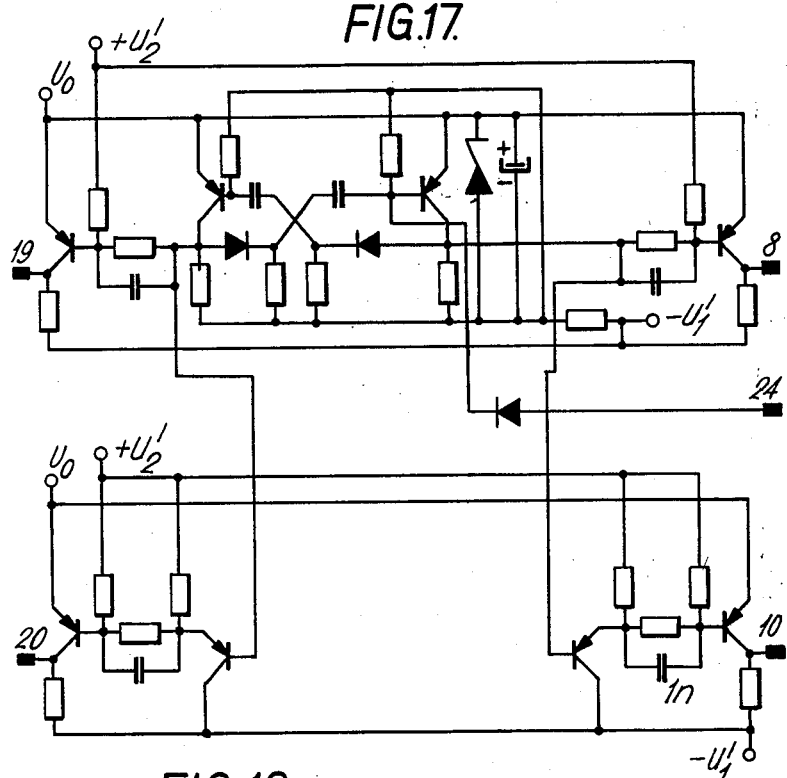

Pulses from the first and second selected product channels of scanning unit 202A are also fed to blend control unit 44 which comprises pulse forming circuits 212, 213 and multivibrator 203 disclosed by FIGURES 16, 18 and 17 respectively.

The circuits hereinbefore described are printed on cards. With reference to FIGURES 19, 19A, 19B, 19C, 20 and 22:

Socket panel 45 is provided into which the terminal sockets of circuits 205A, 204A, 209A, 210A, 202A, 203, 211, 210 are fitted as shown. Socket panel 46 is provided into which the terminal sockets of circuits 205A, 204A, 209A, 201A, 206, 207, 208 and 110 are fitted as shown.

Connections are made by means of the terminal board 47 to readout systems 21 and 22 and by means of sockets 48, 49 and 50 to the preselector switch wiring circuit disclosed by FIGURE 20.

With reference to FIGURES 21 and 22.

Signals from the pulse forming circuits 212 and 213 are fed into transformers 51 and 52. The outputs from transformers 51 and 52 are fed into opposite arms of a bridge circuit, the point of balance of which is selected by means of selector switch 39. Double pole switch 53 controlling the actuating mechanism of ganged blend valve 23A and 23B. is actuated when the bridge is unbalanced by current flowing in the bridge, the direction of flow of the current controlling the direction of throw of the switch and thereby direction of the actuating mechanism of the valves.

I. CONNECTIONS FROM THE TERMINAL BOARD 47 TO THE SOCKET PANEL 45

Table 1

| Card 209A | | Terminal Board 47 | | | |
|---|---|---|---|---|---|
| Number | Pin | 1 Decade | 2 Decade | 3 Decade | 4 Decade |
| 0 | 22 | 2E | 2F | 2G | 2H |
| 1 | 23 | 3E | 3F | 3G | 3H |
| 2 | 24 | 4E | 4F | 4G | 4H |
| 3 | 25 | 5E | 5F | 5G | 5H |
| 4 | 1 | 6E | 6F | 6G | 6H |
| 5 | 2 | 7E | 7F | 7G | 7H |
| 6 | 3 | 8E | 8F | 8G | 8H |
| 7 | 4 | 9E | 9F | 9G | 9H |
| 8 | 5 | 10E | 10F | 10G | 10H |
| 9 | 6 | 11E | 11F | 11G | 11H |
| 10 | 7 | 12E | 12F | 12G | 12H |
| 11 | 8 | 13E | 13F | 13G | 13H |

Table 2

[Card 205A]

| Symbol | Pin | 1 Decade | 2 Decade | 3 Decade | 4 Decade |
|---|---|---|---|---|---|
| Contact 1 | 24 | 2J | 4J | 9J | 11J |
| Contact 2 | 19 | 3J | 5J | 10J | 12J |
| Contact 3 | 17 | 2K | 4K | 9K | 11K |
| Contact 4 | 10 | 3K | 5K | 10K | 12K |
| Magnet | 3 | 1J | 6J | 8J | 13J |

Table 3

[Card 201A]

| Symbol | Pin | Board 47 | Symbol | Pin | Board 47 |
|---|---|---|---|---|---|
| Switch | 1 | 8A | Anode | 18 | 11B |
| Cathode | 2 | 9A | Do | 23 | 13B |
| Anode | 5 | 9B | Switch | 24 | 12A |
| Switch | 16 | 10A | Cathode | 25 | 13A |
| Cathode | 17 | 11A | | | |

Table 4

[Card 204A]

| Symbol | Pin | Board 47 |
|---|---|---|
| Zero-reset | 14 | 12L |

Table 5

[Card 203A]

| Pin | Board 47 | Pin | Board 47 |
|---|---|---|---|
| 3 | 7A | 19 | 10L |
| 6 | 6A | 20 | 11L |
| 8 | 8L | 24 | 7K |
| 10 | 9L | | |

Table 6

[Card 211A]

| Symbol | Pin | Board 47 |
|---|---|---|
| $-U_1'$ | 4 | 7L |

Table 7

[Card 210A]

| Symbol | Pin | Board 47 |
|---|---|---|
| $-U_2''$ | 14 | 6L |
| $+U_2$ | 26 | 2L |
| $+U_2'$ | 27 | 5L |
| $U_0$ | 28 | 3L |
| $-U_1$ | 29 | 4L |

II. CONNECTIONS FROM THE TERMINAL BOARD 47 TO THE SOCKET PANEL 46

*Table 8*

| Card 209 | | Terminal Board 47 | | | |
|---|---|---|---|---|---|
| Number | Pin | 1 Decade | 2 Decade | 3 Decade | 4 Decade |
| 0 | 22 | 25E | 25F | 25G | 25H |
| 1 | 23 | 24E | 24F | 24G | 24H |
| 2 | 24 | 23E | 23F | 23G | 23H |
| 3 | 25 | 22E | 22F | 22G | 22H |
| 4 | 1 | 21E | 21F | 21G | 21H |
| 5 | 2 | 20E | 20F | 20G | 20H |
| 6 | 3 | 19E | 19F | 19G | 19H |
| 7 | 4 | 18E | 18F | 18G | 18H |
| 8 | 5 | 17E | 17F | 17G | 17H |
| 9 | 6 | 16E | 16F | 16G | 16H |
| 10 | 7 | 15E | 15F | 15G | 15H |
| 11 | 8 | 14E | 14F | 14G | 14H |

*Table 9*

[Card 205]

| Symbol | Pin | 1 Decade | 2 Decade | 3 Decade | 4 Decade |
|---|---|---|---|---|---|
| Contact 1 | 24 | 25J | 23J | 18J | 16J |
| Contact 2 | 19 | 24J | 22J | 17J | 15J |
| Contact 3 | 17 | 25K | 23K | 18K | 16K |
| Contact 4 | 10 | 24K | 22K | 17K | 15K |
| Magnet | 3 | 26J | 21J | 19J | 14J |

*Table 10*

[Card 201]

| Symbol | Pin | Board 47 | Symbol | Pin | Board 47 |
|---|---|---|---|---|---|
| Switch | 1 | 19A | Anode | 18 | 16B |
| Cathode | 2 | 18A | Do | 23 | 14B |
| Anode | 5 | 18B | Switch | 24 | 15A |
| Switch | 16 | 17A | Cathode | 25 | 14A |
| Cathode | 17 | 16A | | | |

*Table 11*

[Card 207]

| Pin | Board 47 |
|---|---|
| 19 | 24A |
| 22 | 26E |
| 23 | 26F |
| 24 | 26G |
| 25 | 26H |

*Table 12*

[Card 202]

| Pin | Board 47 |
|---|---|
| 8 | 19L |
| 10 | 18L |
| 19 | 17L |
| 20 | 16L |

*Table 13*

[Card 110]

| Symbol | Pin | Board 47 |
|---|---|---|
| $a_1 b_1$ | 1 | 24B |
| f-Cont | 3 | 22A |
| f-Cont | 4 | 22B |
| $-U_1$ | 14 | 23L |
| $d_4$-Cont | 15 | 14C |
| $d_4$-Cont | 16 | 15C |
| $d_3$-Cont. m | 18 | 23A |
| $d_3$-Test | 19 | 16C |
| C-rel. VII | 20 | 26D |
| C-Cont | 25 | 21A |
| C-Cont | 26 | 21B |
| $d_3$-Cont | 17 | 23B |
| $U_0$ | 27 | 24L |

*Table 14*

[Card 206]

| Pin | Board 47 |
|---|---|
| 1 | 15L |
| 6 | 20K |
| 14 | 20A |

*Table 15*

Card 208

| Symbol | Pin | Board 47 |
|---|---|---|
| I | 24 | 14D |
| II | 23 | 15D |
| III | 22 | 16D |
| IV | 19 | 17D |
| V | 18 | 18D |
| W | 13 | 21D |
| U | 12 | 22D |
| $+U_2$ | 26 | 25L |
| $+U_2'$ | 27 | 22L |
| $-U_1'$ | 30 | 20L |
| $-U_1''$ | 31 | 21L |

III. CONNECTIONS ACROSS TERMINAL BOARD 47

*Table 16*

| Symbol | Volume | | Board 47 | Price | |
|---|---|---|---|---|---|
| | Card | Pin | | Pin | Card |
| $+U_2$ | 210 | 26 | 2L–25L | 26 | 207b |
| $U_0$ | 210 | 28 | 3L–24L | 27 | 110b |
| $-U_1$ | 210 | 29 | 4L–23L | 14 | 110b |
| $+U_2'$ | 210 | 27 | 5L–22L | 27 | 207b |
| $-U_1''$ | 210 | 14 | 6L121L | 31 | 207b |
| $-U_2'$ | 211 | 4 | 7L–20L | 30 | 207b |
| Multivibrator | 203 | 8 | 8L–19L | 8 | 202 |
| Do | 203 | 10 | 9L–18L | 10 | 202 |
| Do | 203 | 19 | 10L–17L | 19 | 202 |
| Do | 203 | 20 | 11L–16L | 20 | 202 |
| Multiv.-pulse | 203 | 24 | 7K–20K | 6 | 206 |
| Zero-reset | 204 | 14 | 12L–15L | 1 | 206 |

IV. CONNECTIONS FROM THE TERMINAL BOARD 47 TO THE READ-OUT SYSTEM

*Table 17*

[Volume Read-Out 22]

| Symbol | Pin | 1 Decade | 2 Decade | 3 Decade | 4 Decade |
|---|---|---|---|---|---|
| Contact 1 | A | 2J | 4J | 9J | 11J |
| Contact 2 | B | 3J | 5J | 10J | 12J |
| Contact 3 | C | 2K | 4K | 9K | 11K |
| Contact 4 | D | 3K | 5K | 10K | 12K |
| $U_0$ | F | 1G | 1G | 1G | 1G |
| Magnet | E | 1J | 6J | 8J | 13J |
| $-U_1$ magnet | H | 1F | 1F | 1F | 1F |

*Table 18*

[Price Read-Out 21]

| Symbol | Pin | 1 Decade | 2 Decade | 3 Decade | 4 Decade |
|---|---|---|---|---|---|
| Contact 1 | A | 25J | 23J | 18J | 16J |
| Contact 2 | B | 24J | 22J | 17J | 15J |
| Contact 3 | C | 25K | 23K | 18K | 16K |
| Contact 4 | D | 24K | 22K | 17K | 15K |
| $U_0$ | F | 1G | 1G | 1G | 1G |
| Magnet | E | 26J | 21J | 19J | 14J |
| $-U_1$ magnet | H | 1F | 1F | 1F | 1F |

*Table 19*

[Motor]

| Symbol | Pin | Board 47 |
|---|---|---|
| 220 volt | D | 1C |
| Do | H | 2C |

V. CONNECTIONS FROM THE TERMINAL BOARD 47 THROUGH THE SOCKETS 48, 49 AND 50 TO THE SWITCHES

*Table 20*

| Board 47 | Socket | Pin | Switch | Level | Contact |
|---|---|---|---|---|---|
| 2E | 48 | A | 3 | 1 | 0 |
| 3E | 48 | B | 3 | 1 | 1 |
| 4E | 48 | C | 3 | 1 | 2 |
| 5E | 48 | D | 3 | 1 | 3 |
| 6E | 48 | E | 3 | 1 | 4 |
| 7E | 48 | F | 3 | 1 | 5 |
| 8E | 48 | H | 3 | 1 | 6 |
| 9E | 48 | J | 3 | 1 | 7 |
| 10E | 48 | K | 3 | 1 | 8 |
| 11E | 48 | L | 3 | 1 | 9 |
| 2F | 48 | M | | | |
| 7F | 48 | T | 5 | 3 | 1 |
| 11F | 48 | X | 5 | 4 | 1 |
| 4G | 48 | AA | | | |
| 6G | 48 | CC | 1 | 2 | 1;3;5... |
| 11G | 48 | JJ | 1 | 2 | 2;4;6... |
| 2H | 48 | KK | 1 | 1 | 1;2 |
| 3H | 48 | LL | 1 | 1 | 3;4 |
| 4H | 48 | MM | 1 | 1 | 5;6 |
| 5H | 48 | NN | 1 | 1 | 7;8 |
| 6H | 49 | A | 1 | 1 | 9;10 |
| 7H | 49 | B | 1 | 1 | 11;12 |
| 8H | 49 | C | 1 | 1 | 13;14 |
| 9H | 49 | D | 1 | 1 | 15;16 |
| 10H | 49 | E | 1 | 1 | 17;18 |
| 11H | 49 | F | 1 | 1 | 19 |
| 20E | 49 | H | 4 | 1 | 5 |
| 21E | 49 | J | 4 | 1 | 4 |
| 22E | 49 | K | 4 | 1 | 3 |
| 23E | 49 | L | 4 | 1 | 2 |
| 24E | 49 | M | 4 | 1 | 1 |
| 25E | 49 | N | 4 | 1 | 0 |
| 26D | 49 | P | 5 | 6 | M |
| 18D | 49 | T | 5 | 5 | M |
| 22D | 49 | U | 5 | 4 | 2 |
| 17D | 49 | V | 5 | 4 | M |
| 21D | 49 | W | 5 | 3 | 2 |
| 16D | 49 | Y | 5 | 3 | M |
| 15D | 49 | Z | 5 | 2 | M |
| 14D | 49 | AA | 5 | 1 | M |
| 26H | 49 | BB | 1 | 1 | 1 |
| 26G | 49 | CC | | | |
| 24D | 49 | DD | 1 | 3 | M |
| 26F | 49 | EE | | | |
| 26E | 49 | FF | 3 | 1 | 0 |
| 3C | 49 | MM | 5 | 7 | M |
| 4C | 49 | NN | | | Lamps |
| 19E | 50 | NN | 4 | 1 | 6 |
| 18E | 50 | MM | 4 | 1 | 7 |
| 17E | 50 | LL | 4 | 1 | 8 |
| 16E | 50 | KK | 4 | 1 | 9 |
| 20F | 50 | CC | 5 | 1 | 3 |
| 16F | 50 | Y | 5 | 4 | 3 |
| 21G | 50 | T | 2 | 2 | 1;3;5... |
| 16G | 50 | M | 2 | 2 | 2;4;6... |
| 25H | 50 | L | 2 | 1 | 1;2 |
| 24H | 50 | K | 2 | 1 | 3;4 |
| 23H | 50 | J | 2 | 1 | 5;6 |
| 22H | 50 | H | 2 | 1 | 7;8 |
| 21H | 50 | F | 2 | 1 | 9;10 |
| 20H | 50 | E | 2 | 1 | 11;12 |
| 19H | 50 | D | 2 | 1 | 13;14 |
| 18H | 50 | C | 2 | 1 | 15;16 |
| 17H | 50 | B | 2 | 1 | 17;18 |
| 16H | 50 | A | 2 | 1 | 19 |

VI. BRIDGE CONNECTIONS ACROSS THE SOCKETS

*Table 21*

| Socket | Pin | to | Socket | Pin |
|---|---|---|---|---|
| 48 | M | | 49 | EE |
| 48 | AA | | 49 | CC |

VII. CONNECTIONS BETWEEN THE SWITCHES

*Table 22*

| Switch | Level | Contact | Switch | Level | Contact |
|---|---|---|---|---|---|
| 1 | 1 | M | 5 | 1 | 1 |
| 1 | 2 | M | 5 | 2 | 1 |
| 1 | 3 | M | 5 | 3 | 0 |
| 1 | 3 | O | 5 | 6 | 1 |
| 2 | 1 | M | 5 | 3 | 3 |
| 2 | 2 | M | 5 | 2 | 3 |
| 2 | 3 | M | 5 | 6 | 3 |
| 3 | 1 | M | 5 | 5 | 1 |
| 4 | 1 | M | 5 | 5 | 3 |

VIII. CONNECTIONS TO THE TERMINAL BOARD 47

*Table 23*

| Symbol | Volume | | | Price | | |
|---|---|---|---|---|---|---|
| | Premium | Diesel | Regular | Premium | Diesel | Regular |
| Cathode | 13A | 11A | 9A | 14A | 16A | 18A |
| Anode | 13B | 11B | 9B | 14B | 16B | 18B |
| Selector switch | 12A | 10A | 8A | 15A | 17A | 19A |
| $-U_1'$ | 12B | 10B | 8B | 15B | 17B | 19B |

*Table 24*

| Symbol | Board 47 | Symbol | Board 47 |
|---|---|---|---|
| 220 volt | 1A | Zero reset $U_0$ | 20B |
| Do | 2A | C-contact | 21A |
| Lamp | 3A | C-contact | 21B |
| Do | 4A | F-contact | 22A |
| $-U_1$ | 25A | F-contact | 22B |
| $U_0$ | 26B | $a_1b_1$-Contact | 24A |
| $+U_2$ | 26C | $a_1b_1$-Contact | 24B |
| Blend control "3" | 6A | $d_3$-Contact | 23B |
| Blend control $U_0$ | 6B | $d_3$-Centre contact | 23A |
| Blend control "B" | 7A | $d_3$-Test contact | 16C |
| Blend control $U_0$ | 7B | $d_4$-Contact | 14C |
| Zero reset "G" | 20A | $d_4$-Contact | 15C |

We claim:

1. A metering system comprising more than two meters, each meter (a) being adapted for use in a fluid stream and being responsive to the rate of flow of fluid passing in association with the meter, (b) being in use connected to a different fluid stream and (c) said meters each being connected to an electrical signal transmitter whereby there is provided a signal train, the train being characteristic of the quantity of fluid passing in association with the meter during a given period; said system also comprising an electrical summating unit adapted to receive, simultaneously, signal trains from any number of transmitters and comprising a switch adapted to connect any number of said transmitters during said period to said electrical summating unit, said electrical summating unit being adapted to provide an output train of electrical signals which is characteristic of the sum of the quantities of fluid, measured in respect of each stream in which the meter in association therewith is connected to a transmitter connected by means of said switch to said summating unit, said system also comprising an electrical trigger circuit adapted to receive said output signal train and adapted to provide an output electrical signal when the sum of the quantities of fluid measured in respect of each stream in which the meter in association therewith is connected to a transmitter connected by means of said switch to said summating unit, reaches a pre-set value.

2. A metering system comprising two meters, each meter (a) being adapted for use in a fluid stream and being responsive to the flow rate of fluid passing in association with the meter, (b) being in use connected to an electrical signal transmitter whereby there is provided a first signal train, the train being characteristic of the quantity of fluid passing in association with the meter during a given period and a second signal train, the train being characteristic of the total price of fluid passing in association with the meter during said period; said system also comprising an electrical summating unit adapted to receive simultaneously said first and second signal trains derived from each transmitter and adapted to provide two output trains of electrical signals, one of which is characteristic of the sum of the quantities, the other of which is characteristic of the sum of the total prices of the fluids passing in association with the meters; said system also comprising an electrical trigger circuit adapted to receive a selected output signal train, said train being selected by a switch B, and adapted to provide an output electrical signal when the sum of a value selected from the values of the quantities of total prices of the fluids passing in association with the meters reaches a pre-set value.

3. A metering system comprising more than two meters, each meter (a) being adapted for use in a fluid stream and being responsive to the rate of flow of fluid passing in association with the meter, (b) being in use connected to a different fluid stream and (c) said meters each being connected to an electrical signal transmitter whereby there is provided a first signal train, the train being characteristic of the quantity of fluid passing in association with the meter during a given period and a second signal train, the train being characteristic of the total price of fluid passing the meter during said period, said system also comprising an electrical summating unit adapted to receive simultaneously, first and second signal trains derived from any number of transmitters and comprising a switch A adapted to connect any number of transmitters during said period to said electrical summating unit, said electrical summating unit being adapted to provide two output trains of electrical signals one train (1) being characteristic of the sum of the quantities, a second train (2) being characteristic of the sum of the total prices of fluid, measured in respect of each stream in which the meter in association therewith is connected to a transmitter connected by means of said switch A to said summating unit; said system also comprising a trigger circuit adapted to receive by means of a switch B a train selected from the group of trains consisting of train (1) and train (2) and adapted to provide an output electrical signal when the sum of a value selected from the values of the quantities of fluids and the sum of the total prices of fluids, measured in respect of each stream in which the meter in association therewith is connected to a transmitter connected by means of said switch A to said summating unit, reaches a preselected value.

4. A metering system according to claim 2 comprising two electrical summating units and two trigger circuits, a first combination of summating unit and trigger circuit being adapted to receive signal trains characteristic of said quantities of the fluids and adapted to provide an output electrical signal when the sum of the quantities of the fluids reaches a pre-selected value, a second combination of summating unit and trigger circuit being adapted to receive signal trains characteristic of said total prices of the fluids and adapted to provide an output electrical signal when the sum of the total prices of fluids reaches a preselected value.

5. A metering system according to claim 2 wherein the signal train provided by each electrical signal transmitter is a pulse train.

6. A metering system according to claim 5 comprising a pulse shaping circuit adapted to shape each of said pulse trains to rectangular wave form.

7. A metering system according to claim 6 wherein said summating unit comprises a scanning unit adapted to scan each shaped pulse train at least twice during the duration of each pulse and adapted to give rise to a signal when a shaped pulse is detected on at least two occasions during the duration of the pulse.

8. A metering system according to claim 7 wherein said summating unit comprises an integrating unit adapted to receive signals from said scanning unit and adapted to give rise to two consecutive signals if two signals are received simultaneously from said scanning unit.

9. A metering system according to claim 8 wherein said summating unit comprises a digital electronic counter adapted to receive signals from said integrating unit.

10. A metering system according to claim 9 wherein each output signal from each electrical summating unit is a pulse train.

11. A metering system according to claim 9 wherein said output signal of said electrical trigger circuit comprises a single pulse.

12. A metering system according to claim 10 wherein said output signal of said trigger circuit is a first pulse followed after a fixed interval by a second pulse.

13. A metering system according to claim 11 comprising flow control means adapted to arrest the flow of fluid in said fluid streams on receipt of said pulse.

14. A metering system according to claim 12 comprising flow control means adapted to diminish the flow of fluid in said fluid streams on receipt of said first pulse and adapted to terminate the flow of fluid in said fluid streams on receipt of said second pulse.

15. A metering system according to claim 14 wherein said flow control means comprises electrically operated valves.

16. A metering system according to claim 15 wherein said trigger circuit comprises a switch adapted to set up a first signal pre-set circuit adapted to be energized at a pre-determined number of pulses before the generation of the total number of pulses corresponding to the integral with respect to time of the value of the property of a fluid measured.

17. A metering system according to claim 16 comprising a solenoid adapted to be energized by said first signal pre-set circuit and adapted partially to close said flow control means.

18. A metering system according to claim 17 comprising a latch adapted to hold the flow control means in a partially closed position.

19. A metering system according to claim 18 wherein said trigger circuit comprises a second signal pre-set circuit adapted to be energized by said first signal pre-set circuit, adapted to respond to the arrival of pulses received subsequently and adapted to initiate the operation of completely closing the flow control means at a point in time determined by the rate of generation of pulses to ensure that closure is completed at substantially the time of arrival of the last of said total number of pulses.

20. A metering system according to claim 19 comprising a solenoid adapted to be energized on receipt of a signal from said second signal pre-set circuit and adapted to release said latch, thereby permitting the flow control means to close completely.

References Cited in the file of this patent

UNITED STATES PATENTS

| | | |
|---|---|---|
| 2,319,444 | Crosby | May 18, 1943 |
| 2,898,040 | Steele | Aug. 4, 1959 |
| 2,923,438 | Logan et al. | Feb. 2, 1960 |
| 2,931,538 | Young et al. | Apr. 5, 1960 |
| 2,998,187 | Wollar | Aug. 29, 1961 |
| 3,036,585 | Shawhan | May 29, 1962 |

UNITED STATES PATENT OFFICE
CERTIFICATE OF CORRECTION

Patent No. 3,130,870　　　　　　　　　　　April 28, 1964

Richard Morrision Phillips et al.

It is hereby certified that error appears in the above numbered patent requiring correction and that the said Letters Patent should read as corrected below.

Column 7, line 38, for "strong" read -- storage --; line 52, strike out "may"; column 14, Table 16, fourth column, line 5 thereof, for "6LI21L" read -- 6L-21L --.

Signed and sealed this 13th day of October 1964.

(SEAL)
Attest:

ERNEST W. SWIDER　　　　　　　　　　EDWARD J. BRENNER
Attesting Officer　　　　　　　　　　Commissioner of Patents